US010298098B2

(12) United States Patent
Niwa

(10) Patent No.: US 10,298,098 B2
(45) Date of Patent: May 21, 2019

(54) POWER TOOL

(71) Applicant: MAKITA CORPORATION, Anjo-shi (JP)

(72) Inventor: Akira Niwa, Anjo (JP)

(73) Assignee: MAKITA CORPORATION, Anjo-Shi (JP)

(*) Notice: Subject to any disclaimer, the term of this patent is extended or adjusted under 35 U.S.C. 154(b) by 405 days.

(21) Appl. No.: 15/149,634

(22) Filed: May 9, 2016

(65) Prior Publication Data

US 2016/0380510 A1 Dec. 29, 2016

(30) Foreign Application Priority Data

Jun. 25, 2015 (JP) ................. 2015-127986

(51) Int. Cl.
*H02K 7/14* (2006.01)
*H02K 11/00* (2016.01)
*H02K 11/215* (2016.01)
*H02K 3/52* (2006.01)
*H02K 29/08* (2006.01)

(52) U.S. Cl.
CPC ......... *H02K 11/0094* (2013.01); *H02K 3/522* (2013.01); *H02K 11/215* (2016.01); *H02K 29/08* (2013.01)

(58) Field of Classification Search
CPC ............ H02K 7/14; H02K 1/27; H02K 11/00; H02K 11/215; H02K 3/12; H02K 9/06; H02K 11/0094; H02K 3/522; H02K 29/08
USPC ......................................................... 310/71
See application file for complete search history.

(56) References Cited

U.S. PATENT DOCUMENTS

| 5,939,807 | A | * | 8/1999 | Patyk | H02K 5/161 310/64 |
| 6,603,304 | B2 | * | 8/2003 | Sekine | G11B 19/28 310/68 B |
| 6,873,072 | B2 | * | 3/2005 | Ganter | H02K 3/50 310/68 R |
| 8,541,913 | B2 | * | 9/2013 | Yoshida | H02K 5/20 310/50 |

(Continued)

FOREIGN PATENT DOCUMENTS

| CN | 201947144 U | 8/2011 |
| CN | 102360523 A | 2/2012 |

(Continued)

OTHER PUBLICATIONS

Unpublished U.S. Appl. No. 15/135,979.

(Continued)

*Primary Examiner* — Naishadh N Desai
(74) *Attorney, Agent, or Firm* — J-Tek Law PLLC; Jeffrey D. Tekanic; Scott T. Wakeman

(57) ABSTRACT

A power tool includes a stator having a coil, a sensor circuit board attached to the stator and on which a magnetic sensor is provided, the sensor circuit board having a first side facing the stator and a second side opposite the first side, a rotor configured to rotate with respect to the stator, a tool-accessory retaining part configured to be driven by the rotor and a power-supply line configured to supply electrical power to the coil. The power-supply line is connected to the coil without traversing the second side of the sensor circuit board.

20 Claims, 15 Drawing Sheets

(56) References Cited

U.S. PATENT DOCUMENTS

| | | | | |
|---|---|---|---|---|
| 2001/0045786 | A1* | 11/2001 | Sekine | H02K 1/2786 |
| | | | | 310/156.31 |
| 2002/0167237 | A1* | 11/2002 | Horng | H02K 5/225 |
| | | | | 310/81 |
| 2003/0230942 | A1 | 12/2003 | Okubo et al. | |
| 2004/0212261 | A1* | 10/2004 | Uchiyama | H02K 29/10 |
| | | | | 310/68 B |
| 2007/0296292 | A1 | 12/2007 | Kienzler et al. | |
| 2008/0069548 | A1 | 3/2008 | Miyaura et al. | |
| 2008/0150402 | A1* | 6/2008 | Tsai | H02K 5/1737 |
| | | | | 310/68 B |
| 2013/0127303 | A1* | 5/2013 | Matsumoto | H02K 9/06 |
| | | | | 310/60 R |
| 2013/0133910 | A1 | 5/2013 | Riedl et al. | |
| 2013/0207491 | A1 | 8/2013 | Hatfield et al. | |
| 2013/0270934 | A1 | 10/2013 | Smith et al. | |
| 2014/0239755 | A1* | 8/2014 | Nagao | H02K 5/20 |
| | | | | 310/54 |
| 2015/0069864 | A1* | 3/2015 | Nagahama | H02K 29/08 |
| | | | | 310/50 |
| 2018/0205288 | A1 | 7/2018 | Nagahama et al. | |

FOREIGN PATENT DOCUMENTS

| | | |
|---|---|---|
| CN | 204123373 U | 1/2015 |
| CN | 104426274 A | 3/2015 |
| CN | 204706999 U | 10/2015 |
| EP | 1115190 A1 | 7/2001 |
| JP | H10584165 | 11/1993 |
| JP | 2004023841 A | 1/2004 |
| JP | 2005341640 A | 12/2005 |
| JP | 2008073779 A | 4/2008 |
| JP | 2015000688 A | 1/2015 |
| JP | 2015009316 A | 1/2015 |
| JP | 2015036167 A | 2/2015 |
| JP | 2015054395 A | 3/2015 |
| JP | 2015056953 A | 3/2015 |
| WO | 0106617 A1 | 1/2001 |

OTHER PUBLICATIONS

Search Report from the Japanese Patent Office dated Oct. 23, 2018 in counterpart Japanese application No. 2015-127986, and machine translation thereof.

Office Action from the Japanese Patent Office dated Oct. 30, 2018 in counterpart Japanese application No. 2015-127986, and machine translation thereof.

Office Action from the Chinese Patent Office dated Dec. 28, 2018 in counterpart Chinese application No. 201610266968.8, and machine translation thereof.

Search Report from the Chinese Patent Office dated Dec. 28, 2018 in counterpart Chinese application No. 201610266968.8, and machine translation thereof.

\* cited by examiner

POWER TOOL

CROSS-REFERENCE

The present application claims priority to Japanese patent application serial number 2015-127986 filed Jun. 25, 2015, the contents of which are incorporated fully herein by reference.

TECHNICAL FIELD

The present disclosure relates to a power tool such as a driver-drill.

BACKGROUND ART

A driver-drill that utilizes a brushless motor is known. The brushless motor of the driver-drill comprises a sensor circuit board, on which rotation-detection devices are mounted. The rotation detection devices are configured to detect the positions of permanent magnets provided on a rotor and to output rotation-detection signals. The brushless motor also includes a stator having a stator core on which multiple coils are sequentially wound in a delta configuration.

SUMMARY OF THE INVENTION

In the above-described driver-drill, signal lines are fastened to the sensor circuit board, and power-supply lines are welded in place; consequently, unless all the signal lines and power-supply lines are disconnected, the brushless motor, the controller, and the battery-mounting part must all be removed collectively if any one of them fails. This makes repair, replacement and/or inspection unnecessarily labor-intensive and costly.

An aspect of the present disclosure is therefore to provide a power tool having a brushless motor that can be repaired and/or inspected more easily and efficiently.

A first aspect of the disclosure comprises a stator comprising at least one coil, a sensor circuit board attached to the stator and on which a magnetic sensor is provided, the sensor circuit board having a first side facing the stator and a second side opposite the first side, a rotor configured or adapted to rotate with respect to the stator, a tool-accessory retaining part configured or adapted to be driven by the rotor, and a power-supply line supplying electrical power to the at least one coil. The power-supply line is connected to the at least one coil without traversing (extending across) the second side of the sensor circuit board.

A second aspect of the disclosure comprises a stator comprising at least one coil, a sensor circuit board attached to the stator and on which a magnetic sensor is provided, a rotor configured or adapted to rotate with respect to the stator, and a tool-accessory retaining part configured or adapted to be driven by the rotor. The sensor circuit board is releasably connected to the stator by at least one screw.

A third aspect of the disclosure comprises a stator comprising at least one coil, a sensor circuit board attached to the stator and on which a magnetic sensor is provided, a rotor configured or adapted to rotate with respect to the stator, a tool-accessory retaining part configured or adapted to be driven by the rotor, a control circuit board configured or adapted to control the rotation of the rotor, a first sensor-signal line connected to the magnetic sensor and a second sensor-signal line connected to the control circuit board. The first sensor-signal line and the second sensor-signal line are releasably connected to one another.

In fourth aspect of the disclosure, the first sensor-signal line and the second sensor-signal line may be connected by connectors, e.g., male and female connectors such as plug-in connectors.

A fifth aspect of the disclosure comprises a stator comprising at least one coil, a rotor configured or adapted to rotate with respect to the stator, a tool-accessory retaining part configured or adapted to be driven by the rotor, a first power-supply line connected to a source of electric power (current), and a second power-supply line connected to the coil. The first power-supply line is releasably connected to the second power-supply line.

In sixth aspect of the disclosure, the first power-supply line and the second power-supply line may be connected to each other by connection terminals, which connection terminals may comprise, for example, male and female plug-in connection terminals.

A seventh aspect of the disclosure comprises a stator comprising at least one coil, a rotor configured or adapted to rotate with respect to the stator, a tool-accessory retaining part configured or adapted to be driven by the rotor, at least one fusing terminal fixed to the stator and connected to the coil, and a power-supply line that comprises stranded wires and is configured or adapted to supply electrical power (current) to the coil. The power-supply line is connected to the at least one fusing terminal and includes a stranded-wire-fray preventing means for preventing fraying of the stranded wires.

In eighth aspect of the disclosure, the power-supply line comprises a covered part that covers the stranded wires, and the stranded-wire-fray preventing means comprises a covering-remaining part. The power-supply line includes an exposed part at which the stranded wires are exposed, and the exposed part is located between the covered part and the covering-remaining part.

The disclosed power tool having a brushless motor can be inspected and/or repaired more quickly and more cost-effectively than a conventional power tool having a brushless motor.

BRIEF DESCRIPTION OF THE DRAWINGS

FIGS. 14A and 14B schematically show a method of winding the wires shown in FIG. 5, wherein FIG. 14A shows the front insulator side and FIG. 14B shows the rear insulator side.

DETAILED DESCRIPTION OF EMBODIMENTS

The embodiments and modified examples thereof of the present teachings are explained below, referencing the drawings where appropriate. Front, rear, up, down, left, and right in these embodiments and modified examples are defined for the sake of convenience of explanation and may change based on, for example, the orientation of the power tool in a particular work situation, the state of a moving structural element, or the like. In addition, the present teachings are not limited to the embodiments and modified examples described below.

Figure 1:
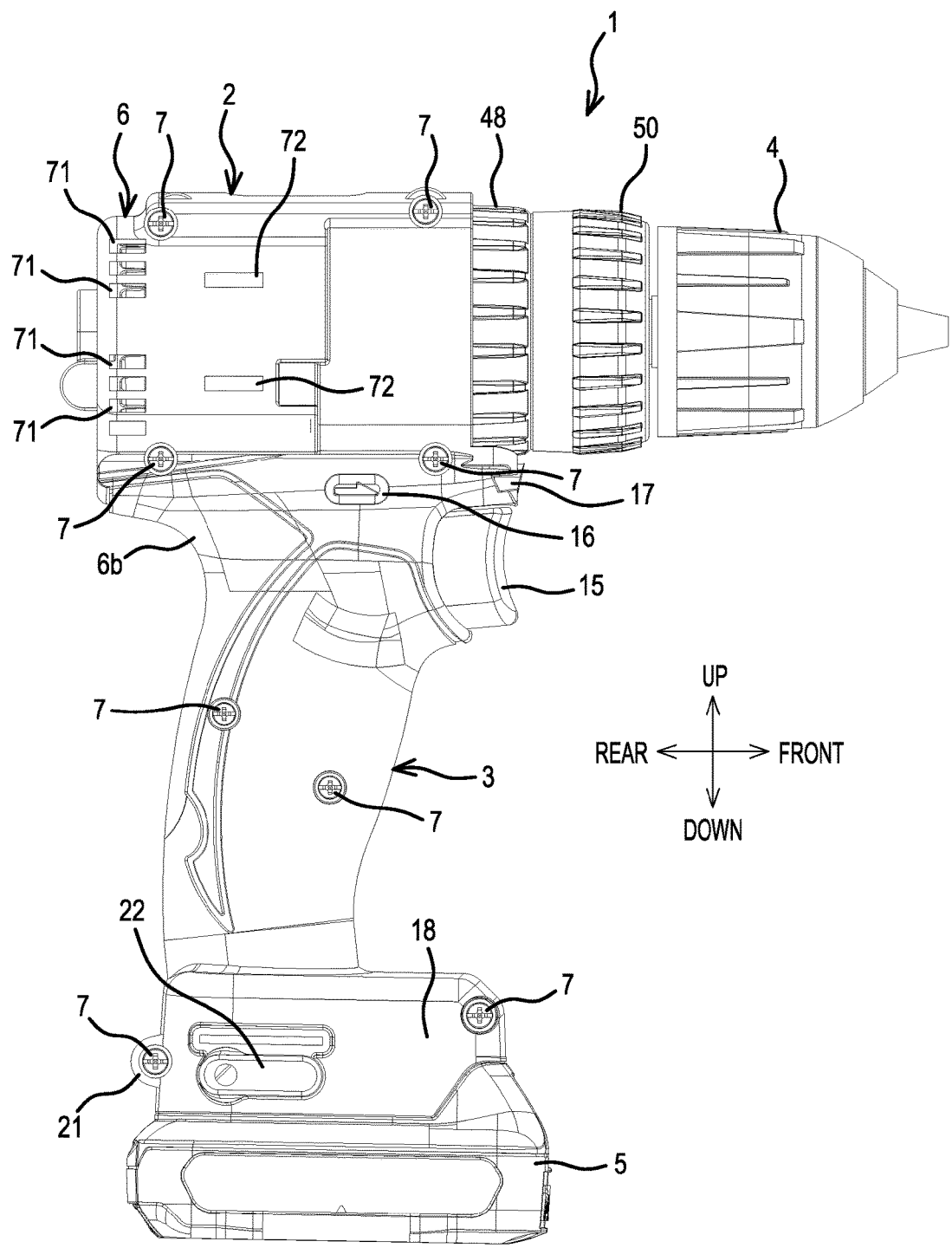
FIG. 1 is a right-side view of a hammer driver-drill according to the present disclosure.
Figure 2:
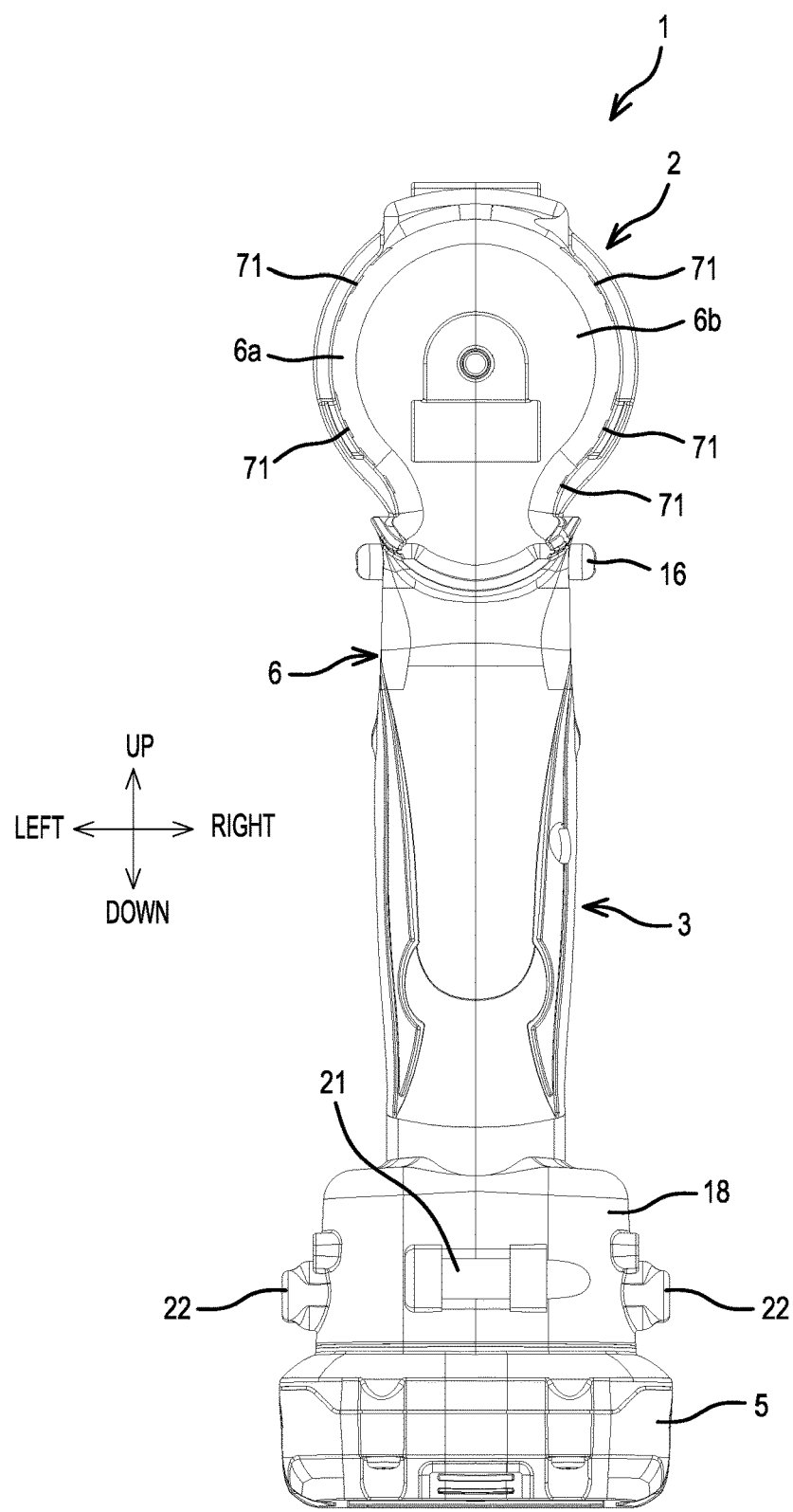
FIG. 2 is a rear view of the hammer driver-drill of FIG. 1.
Figure 3:
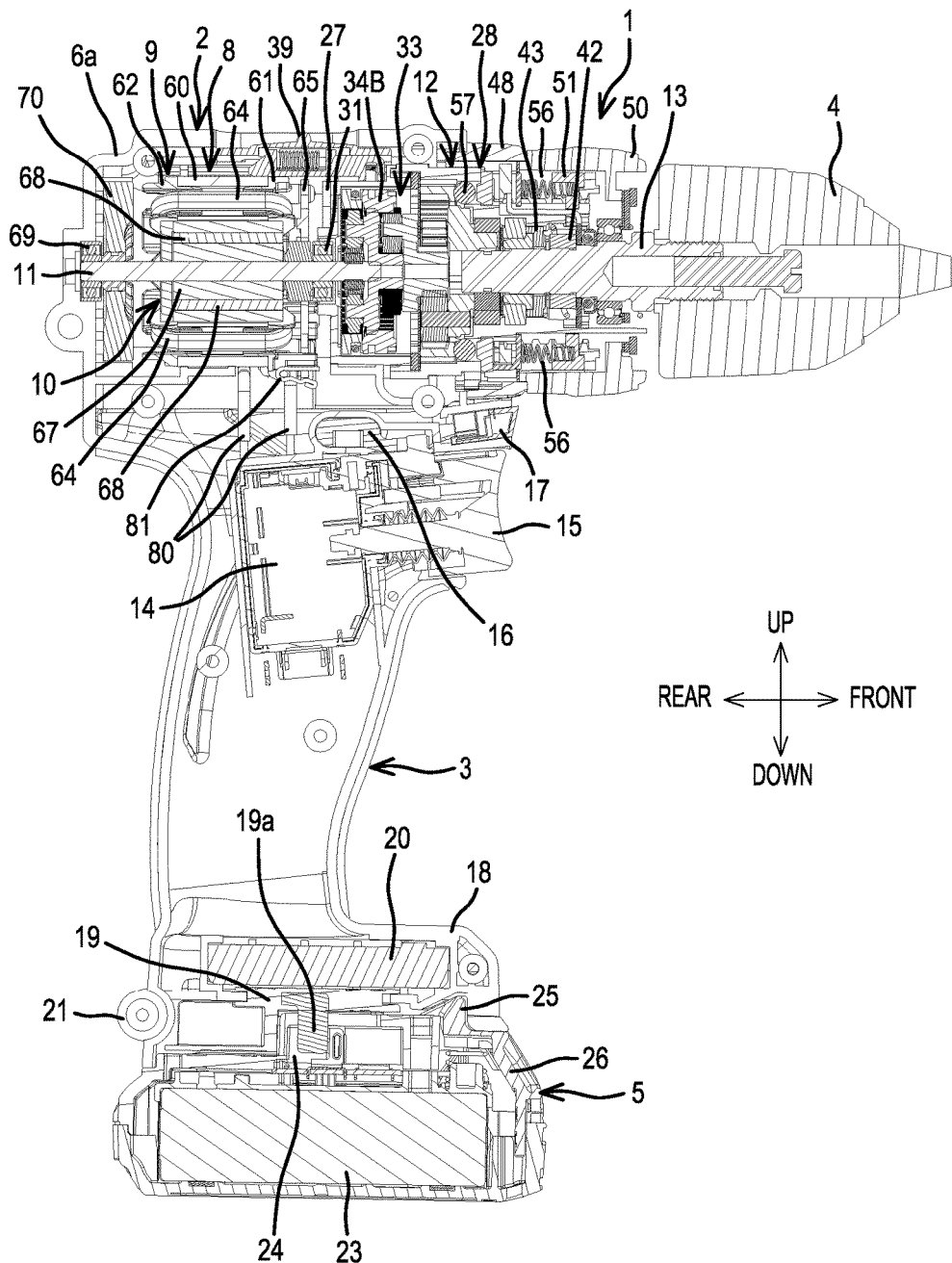
FIG. 3 is a center longitudinal-cross-sectional view of the hammer driver-drill of FIG. 1.
Figure 4:
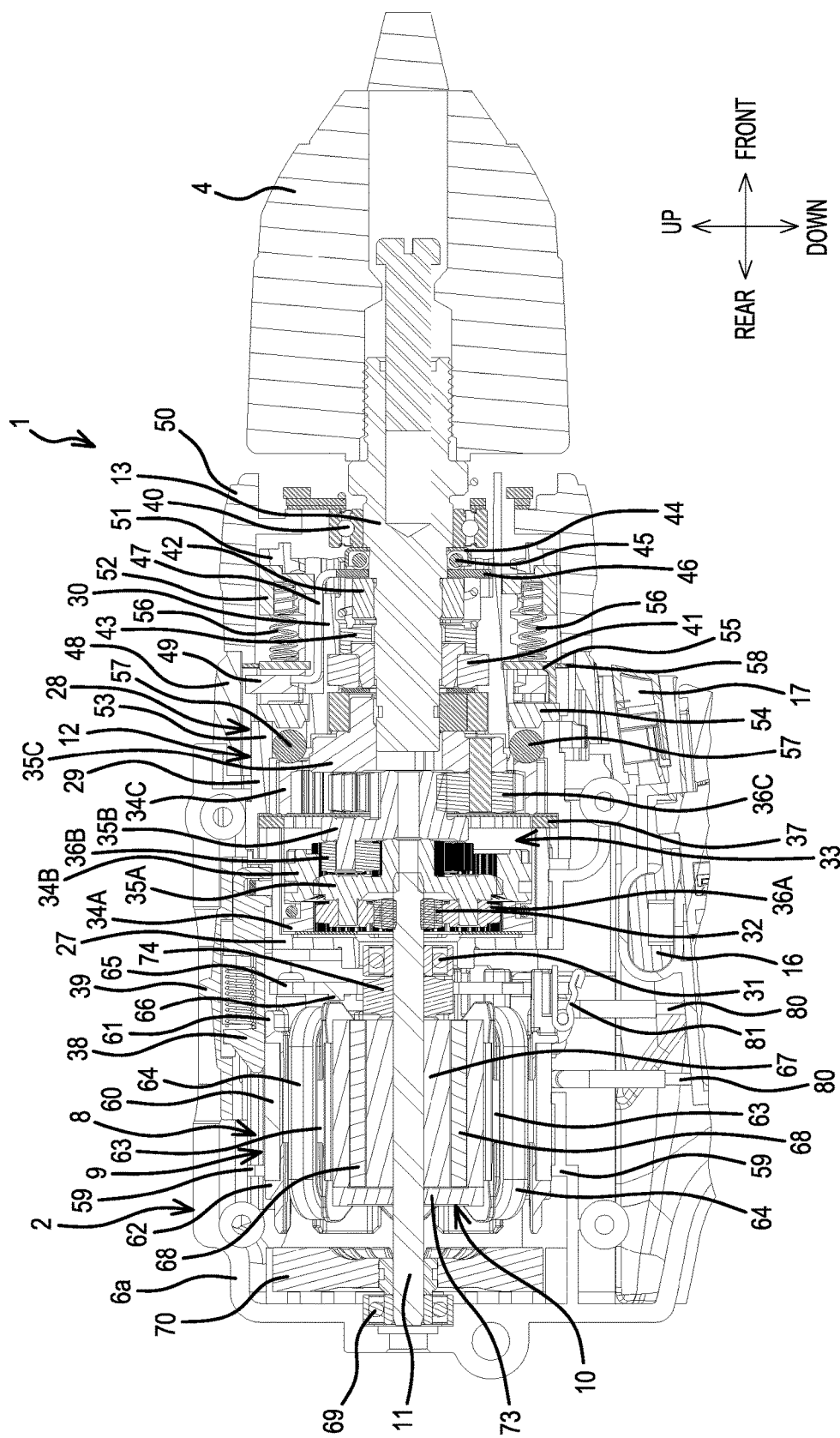
FIG. 4 is an enlarged view of a main-body part of the hammer driver-drill of FIG. 3.
Figure 5:
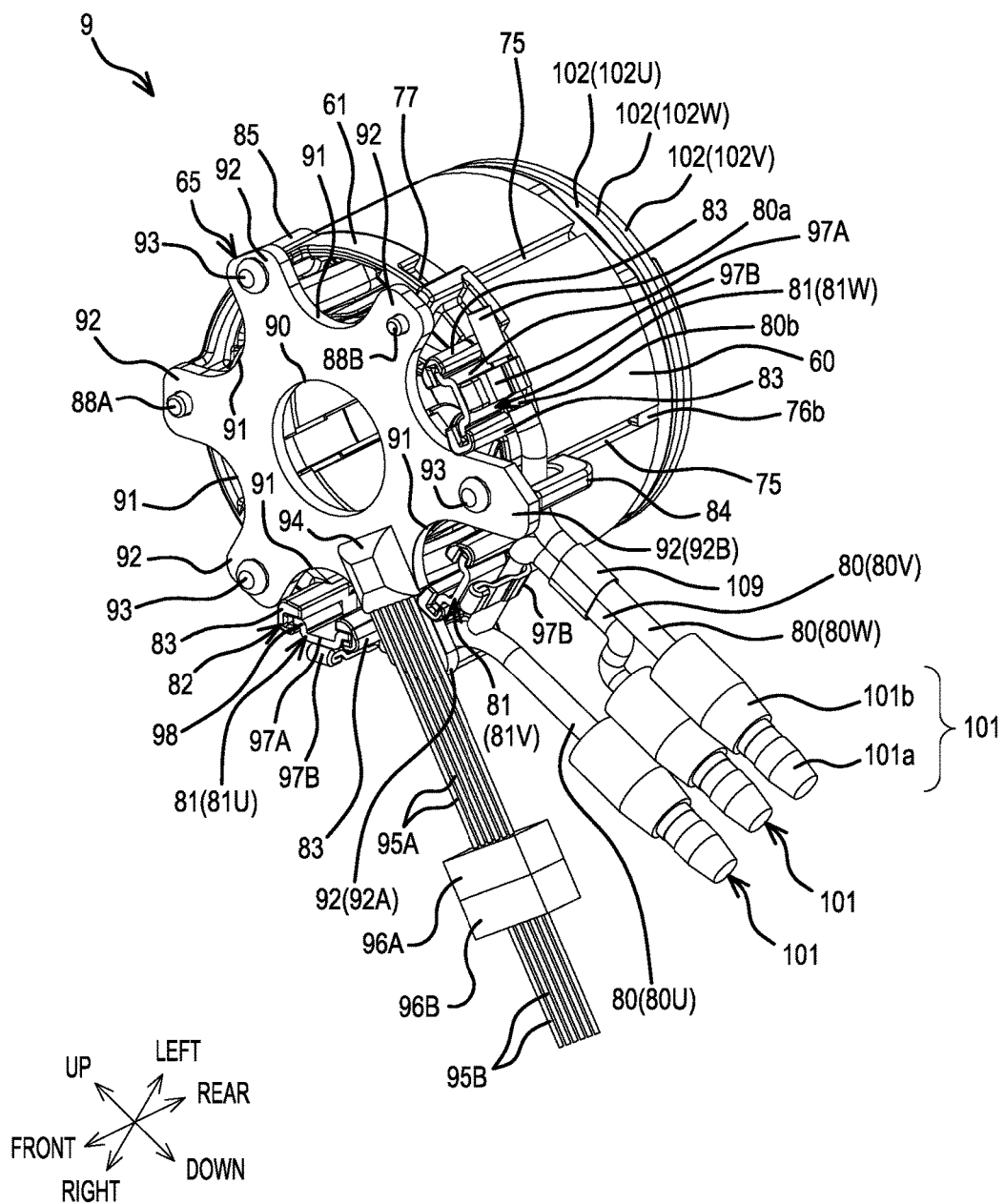
FIG. 5 is an oblique view of a stator the hammer driver-drill of FIG. 1.
Figure 6:
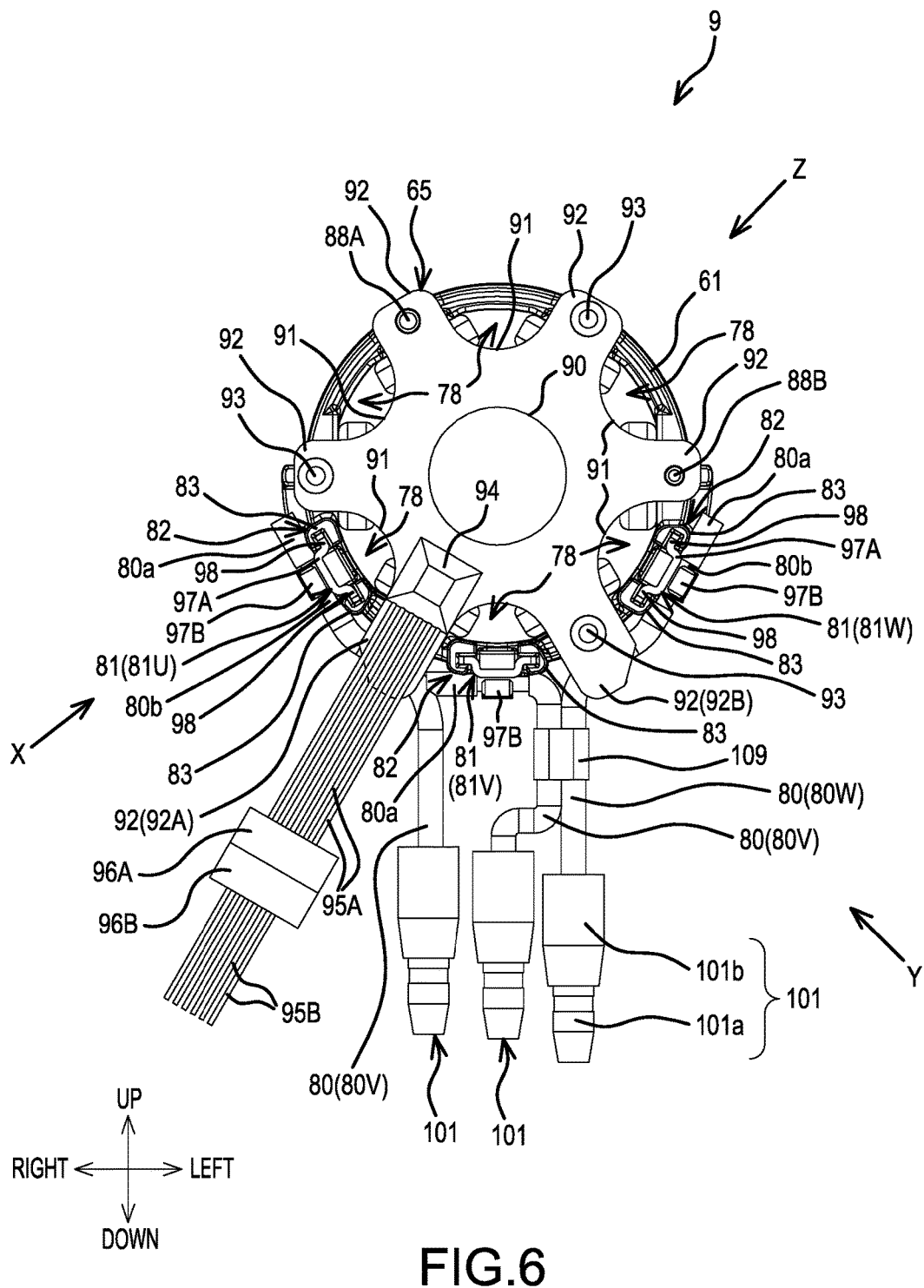
FIG. 6 is a front view of the stator of FIG. 5.
Figure 7:
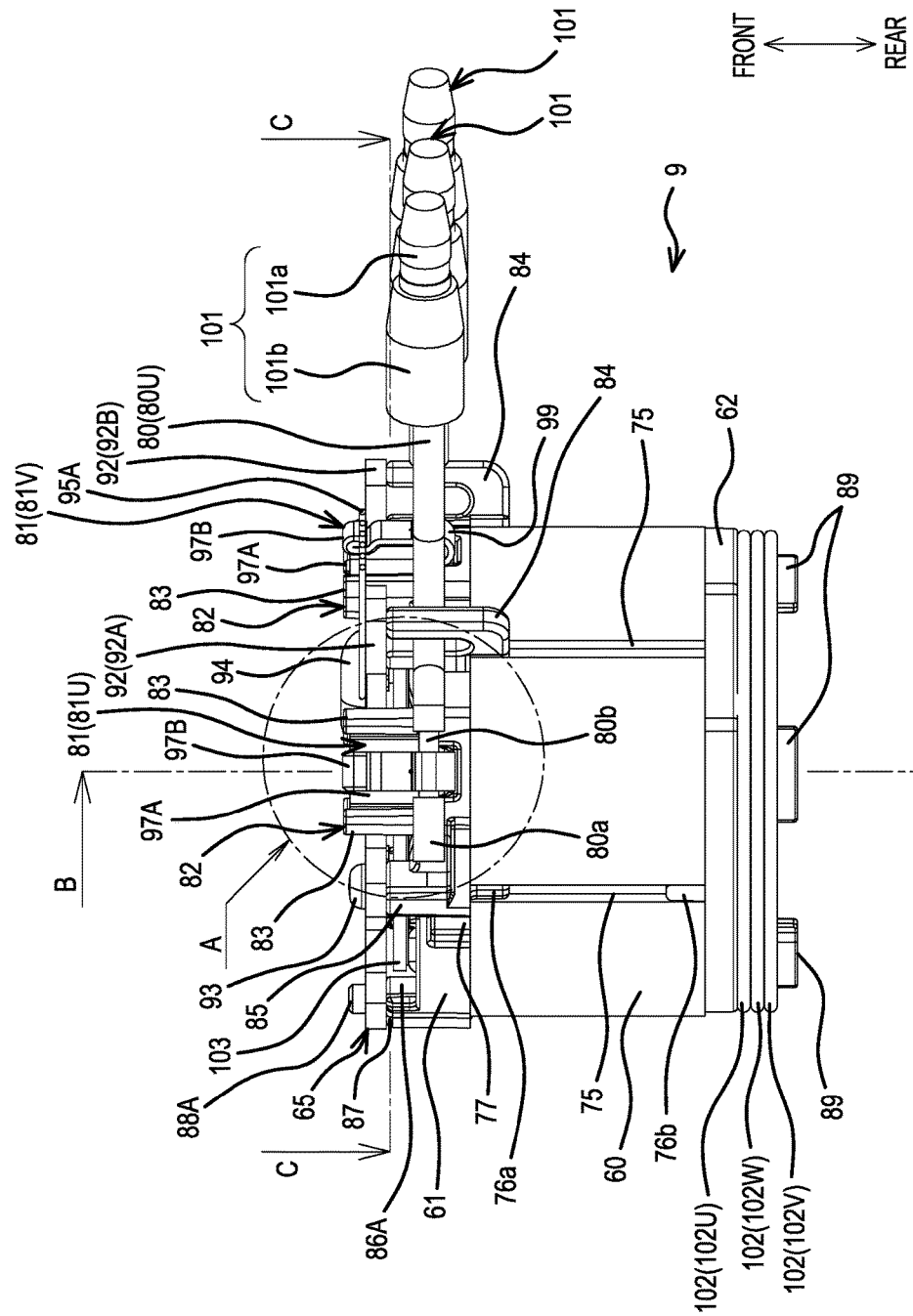
FIG. 7 is a side elevational view in the direction of arrow X in FIG. 6.
Figure 8:
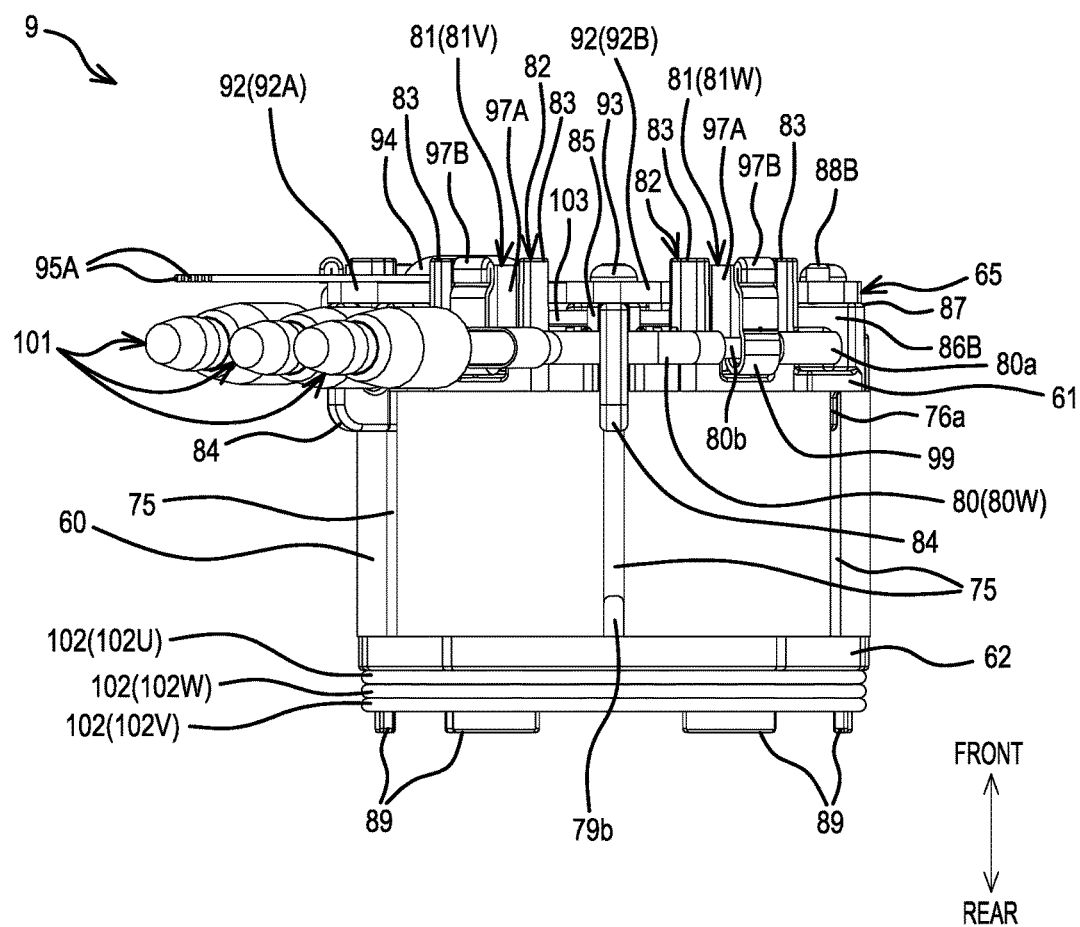
FIG. 8 is a side elevational view in the direction of arrow Y in FIG. 6.
Figure 9:
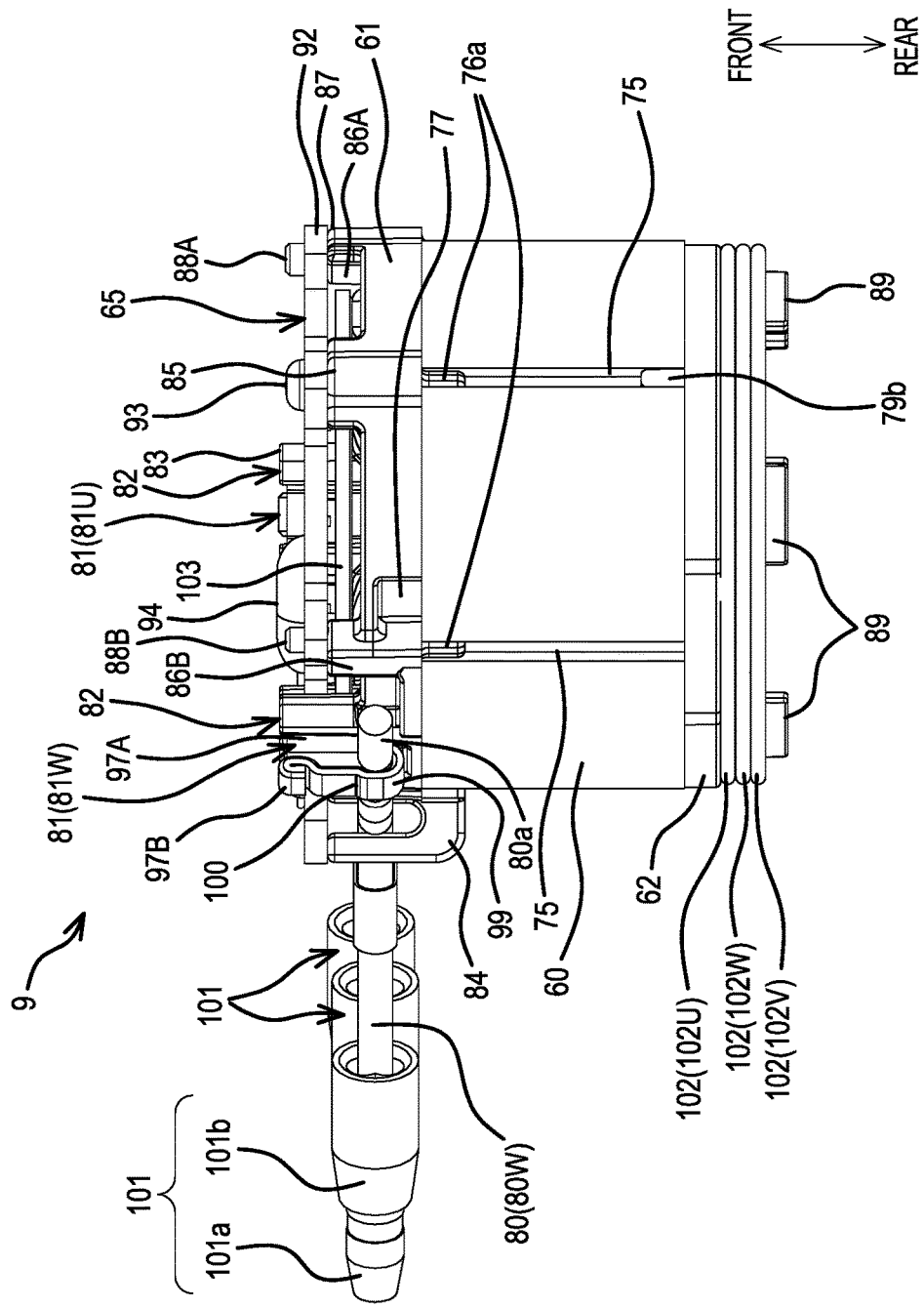
FIG. 9 is a view in the direction of arrow Z in FIG. 6.
Figure 10:
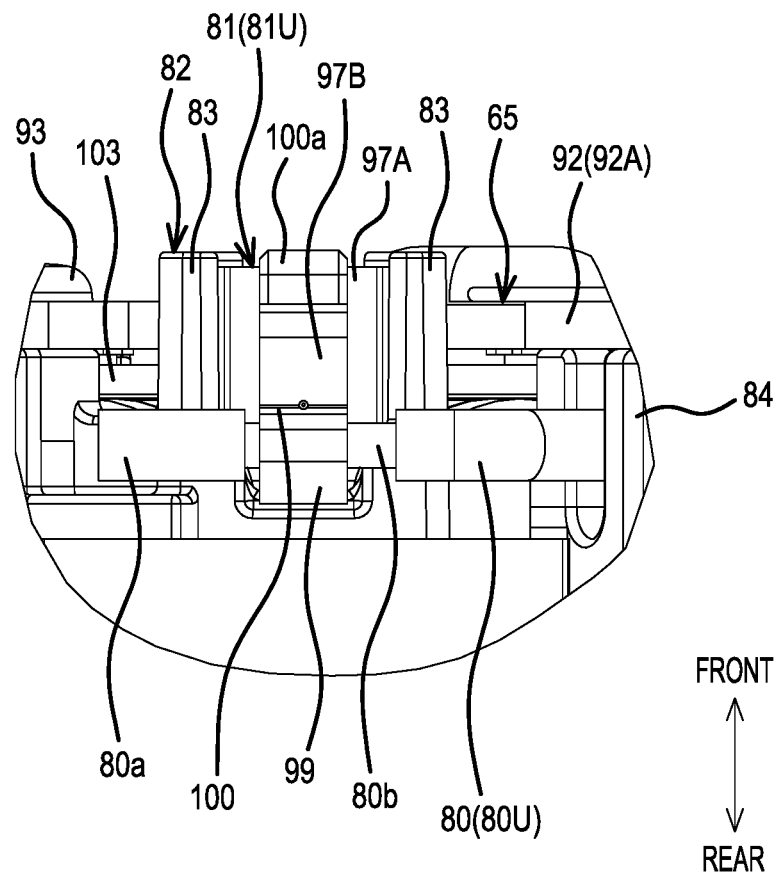
FIG. 10 is an enlarged view of section A in FIG. 7.

FIG. 1 is a right-side view of a representative hammer driver-drill 1, which serves as one non-limiting embodiment of a power tool according to the present teachings; FIG. 2 is a rear view thereof; FIG. 3 is a center longitudinal-cross-sectional view thereof; and FIG. 4 is an enlarged cross-sectional view of a main-body part thereof. The hammer driver-drill 1 includes a tubular main body 2, the central axis of which is oriented in a front-rear direction, and a handle 3 that protrudes downward from a lower part of the main body 2. A drill chuck 4, which serves as a tool-accessory retaining part and is configured or adapted to grasp or chuck a bit (a tool accessory) at a tip part, is provided on a front end of the main body 2. In addition, a battery pack 5, which serves as a power supply, is detachably mounted on a lower end of the handle 3. A housing 6, which is a rear-half portion of the main body 2 and an outer wall of the handle 3, is formed by assembling (joining), using screws 7 extending in the left-right direction, left and right half housings 6a, 6b. Furthermore, in FIGS. 1, 3, and 4, the right is the front.

A brushless motor 8 is housed inside a rear part of the main body 2. The brushless motor 8 is an inner-rotor type brushless motor that comprises a tubular stator 9 and a rotor 10 rotatably disposed in the interior of the stator 9 and configured or adapted to rotate with respect to the stator 9. The rotor 10 comprises a rotary shaft 11. A gear assembly 12 is assembled (disposed or mounted) forward of the brushless motor 8. The gear assembly 12 comprises a spindle 13 that protrudes forward from the housing 6, and a drill chuck 4 is attached to a front part of the spindle 13. The gear assembly 12 reduces the speed of the rotation of the rotary shaft 11 of the brushless motor 8 and transmits that rotation to the spindle 13. A switch 14 is housed in an upper part of the handle 3, downward of the main body 2. The switch 14 comprises a trigger 15 that extends from the housing 6. A forward/reverse-changing button 16, which switches the rotational direction of the rotary shaft 11, is provided upward of the switch 14, and, forward thereof, an LED 17 that illuminates forward of the drill chuck 4 is housed in a diagonally upward orientation.

A mounting part 18, onto which the battery pack 5 is slidably mounted from the front, is formed on a lower end of the handle 3. The mounting part 18 houses: a terminal block 19, which comprises terminals 19a to which the battery pack 5 is electrically connected, and a controller 20, which serves as a control circuit board and comprises a microcontroller that controls the brushless motor 8, six switching devices, etc., and whereto the switch 14, the stator 9 of the brushless motor 8, and the like are electrically connected. A strap-anchoring part 21 is provided on a rear surface of the mounting part 18 using a screw boss, and reference numbers 22 are hook-attachment parts on left and right sides of the mounting part 18, to which hooks are attached for hanging the power tool on a tool belt when not in use. The battery pack 5 further includes a rechargeable battery 23, which comprises three (e.g., lithium ion) rechargeable-battery cells and is capable of producing a voltage, e.g., of 10.8 V, terminals 24, and a locking (latching) hook 25. The hook 25 can be released from a corresponding latching part provided on the mounting part 18 by pushing down on a button 26.

The gear assembly 12 comprises a tubular first gear case 27, which is located forward of the brushless motor 8, and a second gear case 28, which is assembled (affixed) forward of the first gear case 27 and has a two-step tubular shape, that is, a large-diameter part 29 and a small-diameter part 30. The tip part of the rotary shaft 11 of the brushless motor 8 is supported by a bearing 31. A pinion 32 is attached on a tip side via the bearing 31, and the first gear case 27 receives the pinion 32 therein.

A planetary-gear, speed-reducing mechanism 33 includes three stages of carriers 35A-35C that, respectively, support a plurality of planet gears 36A-36C respectively revolving inside internal gears 34A-34C disposed in an axial direction. The speed-reducing mechanism 33 is housed in an inner part of the gear assembly 12, and the pinion 32 of the rotary shaft 11 meshes with the first-stage planet gear 36A. The second-stage internal gear 34B is rotatable and is moveable forward and rearward in the axial direction; furthermore, at an advanced position, the second-stage internal gear 34B is capable of meshing with a coupling ring 37, which is held inside the large-diameter part 29.

A speed change lever 39, which is provided in the housing 6 such that it is capable of sliding forward and rearward, is coupled to the internal gear 34B via a linking member 38. When the speed change lever 39 is slid rearward, the internal gear 34B retracts via the linking member 38 and meshes with an outer circumference of the first-stage carrier 35A while maintaining the meshing with the second-stage planet gear 36B. In this rearward position of the speed change lever 39, a high-speed mode results wherein the second-stage deceleration is omitted (cancelled). Conversely, when the speed change lever 39 is slid forward, the internal gear 34B advances, separating from the carrier 35A, via the linking member 38, and meshes with the coupling ring 37 while maintaining the meshing with the second-stage planet gear 36B, and thereby rotation is restricted. In this forward position of the speed change lever 39, a low-speed mode results wherein the second-stage deceleration functions.

A hammer (percussion) mechanism that imparts hammering (percussion) to the spindle 13 in the axial direction is provided on an inner side of the small-diameter part 30 of the second gear case 28. Furthermore, a clutch mechanism, which cuts off the transmission of torque to the spindle 13 at a prescribed load on the spindle 13, is provided on an outer side of the small-diameter part 30. This design provides two switchable operating modes, namely (i) a drilling mode in which the spindle 13 only rotates without being hammered, and (ii) a clutch mode (driving mode) in which the transmission of torque to the spindle 13 is cut off at a prescribed load. Each of the operating modes and a switching operation will be further described in the following.

In the hammer mechanism, the spindle 13 is supported by front and rear bearings 40, 41 inside the small-diameter part 30, and a rear end of the spindle 13 is slidably coupled to the third-stage carrier 35C. Between the bearings 40, 41 in the spindle 13, a ring-shaped first cam 42 and a ring-shaped second cam 43 are externally mounted coaxially from the front. The first cam 42 has a cam gear on its rear surface and is coupled to the spindle 13 via a spline. The second cam 43 has a cam gear on its front surface and is disposed such that it is non-rotatable when the second cam 43 surrounds the spindle 13 inside the small-diameter part 30.

Furthermore, forward of the first cam 42, a plurality of steel balls 45 is held by a ring-shaped receiving plate 44 between the first cam 42 and the bearing 40, and a cam plate 46 is provided between the balls 45 and the first cam 42. In addition, an arm 47 extends rearward from the cam plate 46. The arm 47 is linked via a linking plate 49 to a mode-changing ring 48, which is rotatably joined to (assembled or mounted on) the large diameter part 29 and is forward of the housing 6. When the linking plate 49 is rotated as a result of a manual rotation of the mode-changing ring 48, the arm 47 causes the first cam 42 to mesh with the second cam 43 by sliding the first cam 42 rearward via the cam plate 46, and to disengage the first cam 42 from the second cam 43 by sliding the first cam 42 forward via the cam plate 46.

In the clutch mechanism, a clutch ring 50 is rotatably provided on an outer side of the small-diameter part 30 forward of the mode-changing ring 48. On an inner side of the clutch ring 50, a screw-feeding plate 51, which conforms with a screw part formed on an outer circumference of the small-diameter part 30, is provided such that it is capable of integrally rotating with the clutch ring 50 and capable of moving in the axial direction. Rearward of the screw-feeding plate 51, a front receiving plate 52, which is capable of forward-rearward movement in the axial direction, is provided in a state wherein the rotation of the small-diameter part 30 is restricted. A pressing plate 54, which contacts a front surface of a closure part 53 between the large-diameter part 29 and the small-diameter part 30, is provided rearward of the front receiving plate 52, and a rear receiving plate 55 is provided forward of the pressing plate 54. Multiple coil springs 56, which are elastic bodies, are disposed equispaced in the circumferential direction between the front receiving plate 52 and the rear receiving plate 55.

Multiple steel balls 57 are disposed equispaced in the circumferential direction inside the closure part 53 and rearward of the pressing plate 54. Each ball 57 contacts a front surface of the third-stage internal gear 34C, which is rotatable, and is capable of engaging in the circumferential direction with a (not shown) clutch cam, which is provided such that it protrudes forward from the front surface of the internal gear 34C. A biasing force of the coil springs 56 is transmitted to the internal gear 34C via the balls 57, the pressing plate 54, and the rear receiving plate 55, which causes the rotation of the internal gear 34C to be restricted or prevented. The rotational operation of the clutch ring 50 screw-feeds the screw-feeding plate 51 and the front receiving plate 52 in the axial direction, thus changing the axial length of the coil springs 56, thereby making it possible to modify the pressing force of the coil springs 56 imparted (applied) to the internal gear 34C.

For each operation mode, at a first rotational position of the mode-changing ring 48, which is a phase (operation mode) in which the cam plate 46 does not slide the first cam 42 rearward, the first cam 42 is disposed forward of the second cam 43 and does not mesh with the second cam 43. Consequently, the rotational operation of the clutch ring 50 results in a clutch mode in which the pressing force imparted (applied) to the internal gear 34C is modifiable. In this clutch mode, if the trigger 15 is squeezed to drive the brushless motor 8, then the rotary shaft 11 rotates and the spindle 13 rotates via the planetary-gear, speed-reducing mechanism 33, thereby making it possible to perform a screw tightening operation or the like with a driver bit mounted in the drill chuck 4. As the screw tightening progresses, the load imparted (applied) to the spindle 13 eventually exceeds the pressing force of the coil springs 56 that fix the internal gear 34C. When this happens, the clutch cam of the internal gear 34C pushes the steel balls 57, the pressing plate 54, and the rear receiving plate 55 forward, the internal gear 34C is idled, and thus the screw tightening ends (clutch operation).

In addition, at a second rotational position at which the mode-changing ring 48 has been rotated from the first rotational position by a prescribed angle, a restraining ring 58, which is provided on the mode-changing ring 48, engages with the rear receiving plate 55 and restricts the advance of the rear receiving plate 55. Consequently, the drilling mode results wherein the movement of the pressing plate 54 forward is continuously restricted (prevented) regardless of the magnitude of the pressing force of the coil springs 56. If the spindle 13 is rotated in the drilling mode, then, regardless of the load imparted (applied) to the spindle 13, the balls 57 do not ride over the clutch cam of the internal gear 34C, and consequently the rotation of the spindle 13 continues while the fixed state of the internal gear 34C remains unchanged. Furthermore, at this time, too, the first cam 42 does not slide rearward, and consequently hammering (percussion) on the spindle 13 does not occur.

Furthermore, at a third rotational position at which the mode-changing ring 48 has been rotated from the second rotational position by a prescribed angle, the cam plate 46 slides the first cam 42 forward. However, the engagement of the restraining ring 58 and the rear receiving plate 55 does not change. Consequently, a hammer mode results wherein the first cam 42 and the second cam 43 engage. When the spindle 13 is rotated in the hammer mode, the first cam 42, which rotates integrally with the spindle 13, engages with the second cam 43 fixed inside the small-diameter part 30, and consequently hammering (percussion) on the spindle 13 occurs. Furthermore, because the fixed state of the pressing plate 54 does not change owing to the restraining ring 58, the rotation of the spindle 13 continues regardless of the load imparted (applied) to the spindle 13.

Figure 13:
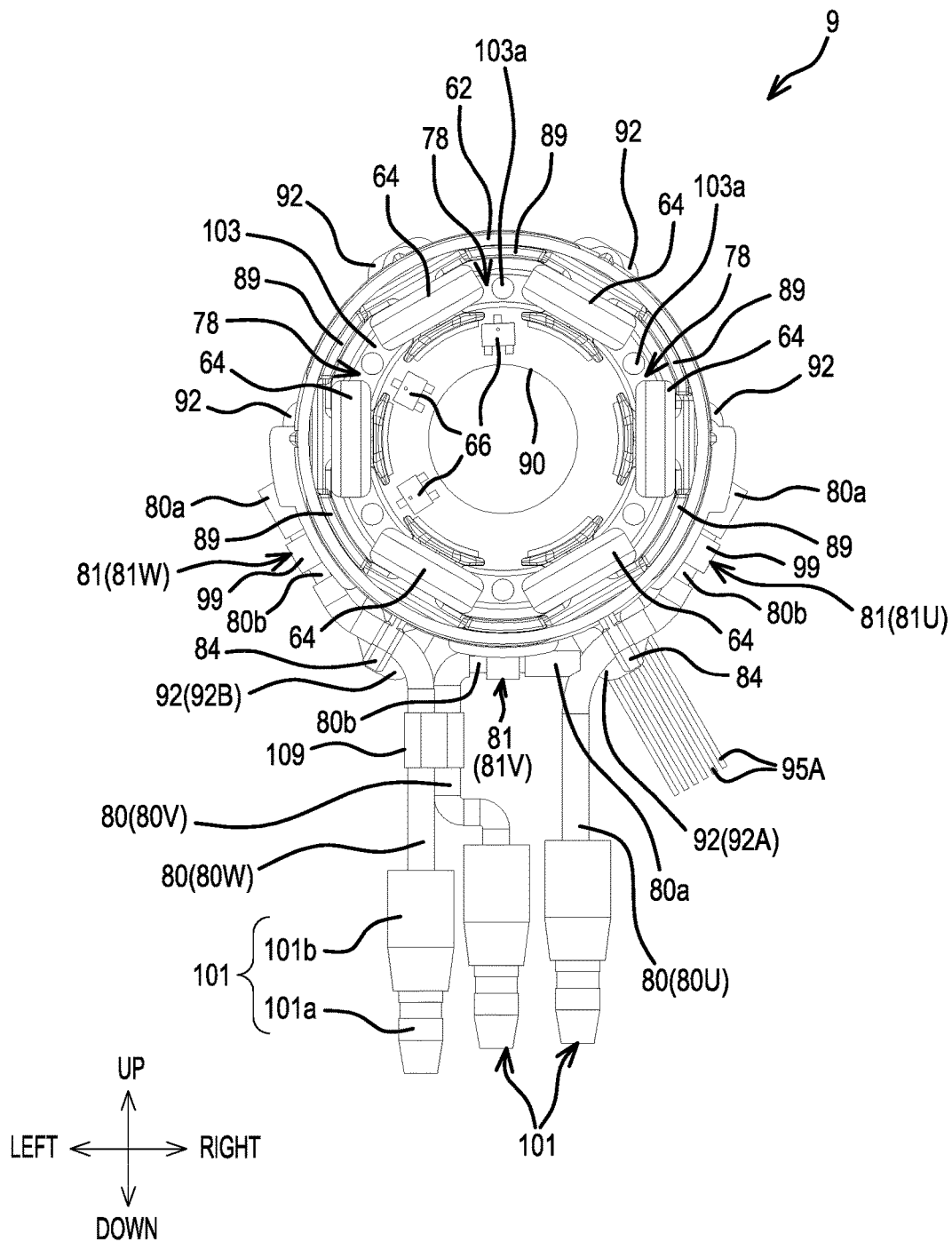
FIG. 13 is a rear view of the stator of FIG. 5.
Figure 14:
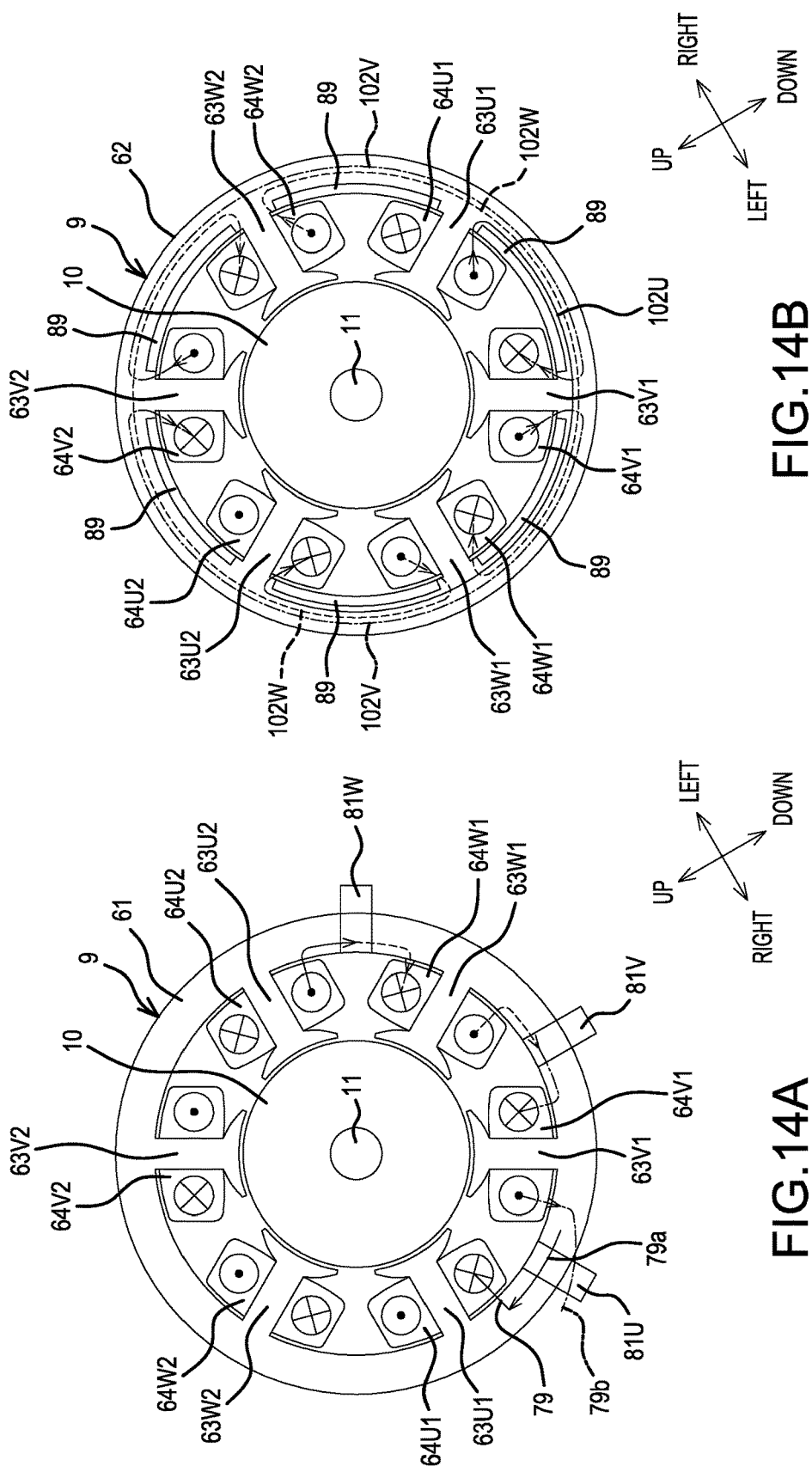

Turning now to the details of the motor 8, the stator 9 of the three-phase brushless motor 8 is held, with the front-rear direction serving as the axial direction, by ribs 59 formed on inner surfaces of the half housings 6a, 6b. As shown in FIGS. 5-8, the stator 9 comprises a stator core 60, which is formed by the lamination of a plurality of steel plates. A front insulator 61 and a rear insulator 62, which are ring-shaped electrically insulating members, are assembled on forward and rearward end surfaces of the stator core 60. Six teeth 63, which protrude inwardly, are disposed equispaced in the circumferential direction on an inner side of the stator core 60, and a coil 64 is wound around each tooth 63. A sensor circuit board 65 is screw-fastened to a front surface of the front insulator 61. Three magnetic sensors 66, which serve as rotation-detection devices that detect positions of permanent magnets 68 disposed on the rotor 10, are installed on the sensor circuit board 65. The magnetic sensors 66 are disposed, at prescribed spacings in the circumferential direction around a through hole 90, on a rear surface of the sensor circuit board 65. As shown in FIG. 13, the magnetic sensors 66 are disposed at the top, the upper left, and the lower left (relative to the orientation of the stator in FIG. 13). Moreover, the rear insulator 62 comprises multiple (six) guide ribs 89, which protrude rearward from the ring-shaped rear surface and are equispaced in the circumferential direction.

The guide ribs 89 are disposed between the teeth 63 in the circumferential direction. Optionally, a temperature-detecting device may be installed (mounted) on the sensor circuit board 65 that generates a temperature-detection signal, which is then transmitted to the controller 20. In such an embodiment, the controller 20 may monitor the temperature-detection signal and stop control of (the supply of current to) the brushless motor 8 in case the controller 20 determines that a temperature greater than or equal to a prescribed temperature has been detected. In such an embodiment, damage caused by an excessive temperature of the brushless motor 8 can be reliably prevented. In hammer driver-drills, such as a hammer driver-drill 1 operating at 10.8 V, a rise in temperature tends to occur comparatively easily, and therefore it is generally desirable to prevent a rise in the temperature within the tool housing to protect temperature-sensitive components.

Referring again to FIGS. 3 and 4, the rotor 10 comprises: a substantially cylindrical rotor core 67, which is formed by laminating (stacking) a plurality of steel plates and is disposed around the rotary shaft 11. Four plate-shaped permanent magnets 68 (e.g., sintered magnets) are fixed to an inner part of the rotor core 67. The permanent magnets 68 are inserted into through holes, which are formed such that, in a transverse cross section of the rotor core 67, they are located at four sides of a square centered on the rotary shaft 11, and are fixed by bonding via an adhesive or by press fitting, or both. A rear end of the rotary shaft 11 is supported by a bearing 69, which is held inside a rear part of the housing 6, and a centrifugal fan 70, which is disposed forward of the bearing 69, is attached to the rotary shaft 11. Air-exhaust ports 71 are formed in the housing 6 (left and right side surfaces) outward in the radial direction of the centrifugal fan 70, and air-suction ports 72 are provided in the housing 6 (a right-side surface) outward in the radial direction of the stator 9 (see FIG. 1).

A rear stop 73 is provided between the rotor core 67 and the centrifugal fan 70. The rear stop 73 is a brass disc and has an outer diameter the same as that of the rotor core 67; it is fastened to the rotary shaft 11 coaxially with the rotor core 67. A front stop 74 is provided on an inner side of the sensor circuit board 65 between the rotor core 67 and the bearing 31 on the front side. The front stop 74 is also a brass disc and has an outer diameter smaller than that of the rotor core 67; it is fastened to the rotary shaft 11 coaxially with the rotor core 67 such that the front stop 74 is spaced apart from the rotor core 67 with a gap in between. However, the outer diameter of the front stop 74 is larger than that of an inner-side circle virtually defined by the positions of the four permanent magnets 68, Furthermore, the front stop 74 is located forward of the permanent magnets 68.

The structure of the stator 9 is discussed in further detail below, referencing principally FIGS. 5-15. Furthermore, in FIGS. 7-11, upward in the figures is the direction toward the front of the hammer driver-drill.

Six grooves 75, each of which is oriented in the axial direction and constitutes a hollow (recess), are formed equispaced in the circumferential direction on an outer circumference of the stator core 60. Multiple press-fitting pieces 76a, which are integrally formed with the front insulator 61 such that they protrude rearward from a rear part thereof, are press-fitted into front-end parts of the grooves 75; and multiple press-fitting pieces 76b, which are integrally formed with the rear insulator 62 such that they protrude forward from a front part thereof, are press-fitted into rear-end parts of the grooves 75. The front insulator 61 and the rear insulator 62 are rigidly integrated with the stator core 60 such that they resist strain even if stress occurs.

In addition, a latching recessed part 77, which is recessed inward in the radial direction with respect to the circumference of the front insulator 61, is formed at the end of one of the grooves 75 of the stator core 60 in a side surface of the front insulator 61. The latching recessed part 77 receives and engages with a projection (not shown) that is provided on the inner surface of the housing 6, and that engagement rotationally locks the stator 9 or positions the stator 9 in the front-rear direction, or both. Furthermore, the number, arrangement, and the like of the latching recessed parts 77 may be modified as appropriate, such as by providing two of the latching recessed parts 77 on the upper and lower ends of the groove 75. Furthermore, instead of the latching recessed part 77 or in combination therewith, a projecting body may be provided on an outer surface of the stator 9, and the rotational locking and/or the positioning of the stator 9 in the front-rear direction may be effected by the engagement of that projecting body with a recessed part provided in the inner surface of the housing 6.

In the rear part of the front insulator 61, six slots 78 are formed between the teeth 63. Inside three adjacent ones of the slots 78, three forward-protruding retaining parts 82 are provided to respectively hold three fusing terminals 81. Each fusing terminal 81 fuses (electrically connects) a wire 79 (FIG. 14) of two of the coils 64 for one phase with a power-supply line 80 for the corresponding phase. Each of the retaining parts 82 comprises a pair of projections 83 that form a U shape in a cross section. The projections 83 face one another, are arranged in the circumferential direction of the front insulator 61, and protrude forward of a ring-shaped, front-end surface of the front insulator 61. Outward from the front sides of the corresponding teeth 63—that is, at portions located between pairs of the three retaining parts 82 on the front insulator 61—hooks 84 are provided, each of which has a U shape in a cross section and each of which is configured or adapted to hold one of the power-supply lines 80. The hooks 84 protrude outward in the radial direction. A rear part of an inner-side portion of each hook 84 is inserted in a corresponding groove 75 of the stator core 60. Two of the three power-supply lines 80 are bundled by tape 109 at a position near the stator 9.

The fusing terminals 81 of the present disclosure may also be called "thermal crimping terminals" or "thermal caulking terminals" and generally enable the formation of a secure, robust connection to a wire (e.g., wire 79) and/or between the wire 79 and one of the power supply lines 80 by applying heat and/or pressure thereto. For example, a method of forming the electrical connection may involve, e.g., applying a sufficiently large current to the metal wire(s) to heat the metal wire(s) while sandwiched or interposed within the fusing terminal, and applying a crimping pressure to the fusing terminal 81 to thereby thermally crimp or clamp the wire(s) to the fusing terminal 81. The metal of the wire(s) may thereby become fused and/or welded to the fusing terminal 81.

In addition, on the front side of the tooth 63 that is located between the retaining parts 82 and on the front sides of the two teeth 63 that are located two teeth away from said tooth 63 in the circumferential directions (i.e., at vertex positions of a virtual regular triangle), three screw bosses 85 for screw-fastening the sensor circuit board 65 are provided such that they protrude forward. A height of each screw boss 85 in the forward direction is lower than a height of each of the retaining parts 82 in the forward direction (i.e., the front end of each screw boss 85 is rearward of the front end of the retaining parts 82). The height of each screw boss 85 in the forward direction is also higher than a height of the front-end surface of the front insulator 61 (i.e., the front end of each screw boss 85 is located forward of the front-end surface of the front insulator 61).

On the front sides of the corresponding teeth 63—that is, at portions located between the upper left and right screw bosses 85 on the front insulator 61—stepped bosses 86A are provided such that they protrude in the forward direction. Each stepped boss 86A comprises a receiving surface 87, which has a forward height the same as the height of the screw bosses 85, and a boss 88A, which protrudes forward of the receiving surface 87. In addition, stepped bosses 86B are likewise provided between the upper left and lower left screw bosses 85 on the front insulator 61. However, the diameter of a boss 88B of the stepped boss 86B is smaller than that of the boss 88A. Furthermore, the stepped bosses 86A, 86B are disposed such that the diameter of a virtual circle that passes through the centers of the stepped bosses 86A, 86B (the bosses 88A, 88B) is smaller than the diameter of a virtual circle that passes through the centers of the three screw bosses 85. Furthermore, the centers of these virtual circles coincide.

The through hole 90 through which the rotary shaft 11 passes is located at the center of the sensor circuit board 65. The sensor circuit board also has six notched parts 91 that are equispaced in the circumferential direction and curved toward the through hole 90, and a plurality of fixing pieces 92 (e.g., six fixing pieces), each of which protrudes in the radial direction, between pairs of adjacent notched parts 91. When looking rearward from the front side, each notched part 91 extends beyond an inner circumference of the stator core 60 and reaches a position that overlaps its corresponding slot 78. In addition, a tip of each fixing piece 92 (an outer-side portion in the radial direction) extends beyond an outer circumference of the stator core 60. Furthermore, the fixing pieces 92 on the lower right (a fixing piece 92A) and the lower left (a fixing piece 92B) are longer than the other four fixing pieces 92.

Screw holes corresponding to the screw bosses 85 are provided in the sensor circuit board 65 at the vertex positions of a virtual regular triangle that connects the tip parts of the fixing pieces 92 (on the lower left, upper left, and right) including the lower left fixing piece 92B. The sensor circuit board 65 is fixed to the stator 9 by screws 93, which are disposed in the corresponding screw holes. In addition, the boss 88A of the stepped boss 86A is inserted into the tip part of the upper-right fixing piece 92, which is located between the upper left and right screws 93, and the boss 88B of the stepped boss 86B is inserted into the tip part of the left fixing piece 92 that is located between the upper left and lower left screws 93.

Furthermore, a connection part 94, which connects upper ends of the six lead wires 95A that output the detection signals of the three magnetic sensors 66, is provided on a front surface of the long, lower right fixing piece 92A. A connector 96A, which bundles the lead wires 95A, is provided on lower ends of the lead wires 95A, which lead wires 95A serve as first sensor-signal lines. Moreover, six lead wires 95B, which serve as second sensor-signal lines, extend out from the controller 20 below, and a connector 96B, which bundles the lead wires 95B, is provided on upper ends thereof. Furthermore, the connectors 96A, 96B are configured or adapted to be attached to and detached from one another. When the connectors 96A, 96B are attached to one another, each lead wire 95A is electrically connected to its corresponding lead wire 95B. The lead wires 95A, 95B and the connectors 96A, 96B are omitted in FIGS. 3, 4 but are partially shown in FIGS. 5-13. The lead wires 95A, 95B are shown as they would be prior to being routed inside the housing 6 (e.g., they are straight). Furthermore, as long as the lead wires 95A, 95B can be connected to one another, there may be two or more of each of the connectors 96A, 96B, or two or even three or more of the connectors 96B may be connected to one connector 96A, such a connection may be made reversely, or the like. In addition, if, for example, there were two of the connectors 96A, then the six lead wires 95A could be split into two groups of three and three, two and four, or one and five. Furthermore, the connector 96A may be male and the connector 96B may be female, and the reverse is also possible; furthermore, male and female elements may be intermixed in one connector. In the case of multiple connectors 96A (96B), a misconnection may be prevented by making them of different sizes, shapes, or the like.

Figure 11:
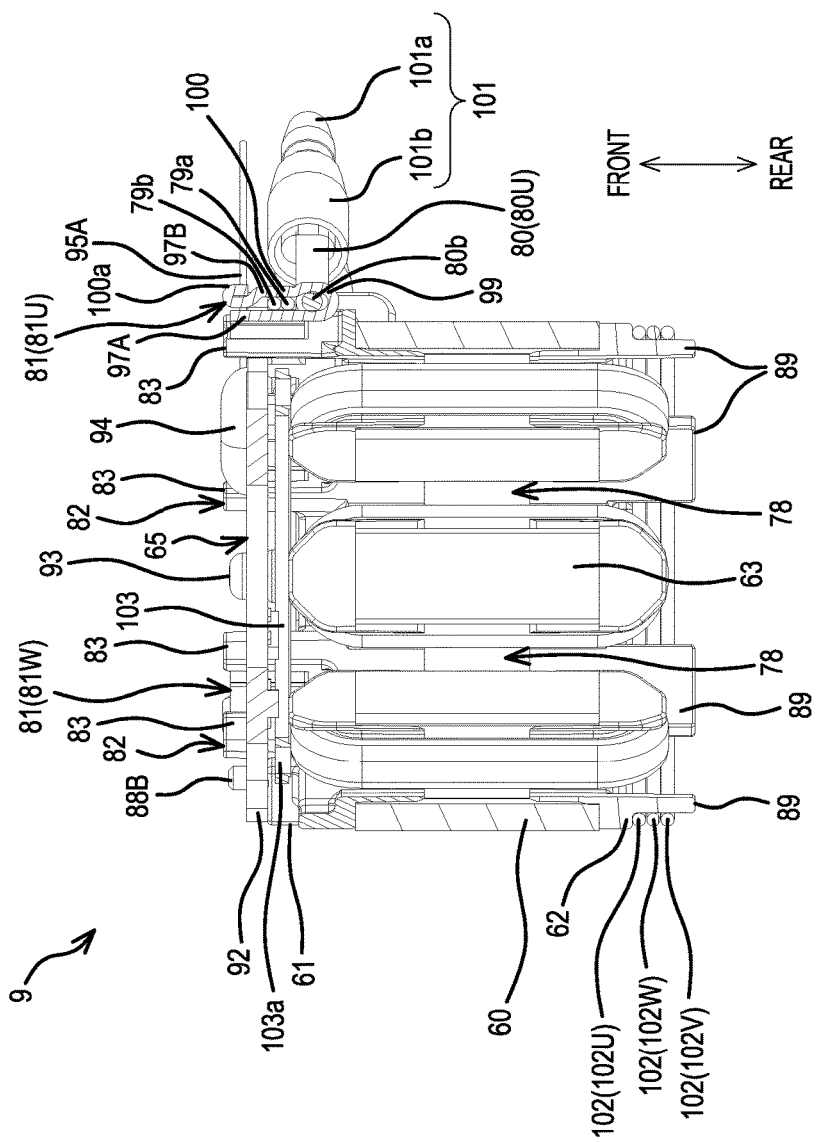
FIG. 11 is a cross-sectional view taken along line B-B in FIG. 7.
Figure 12:
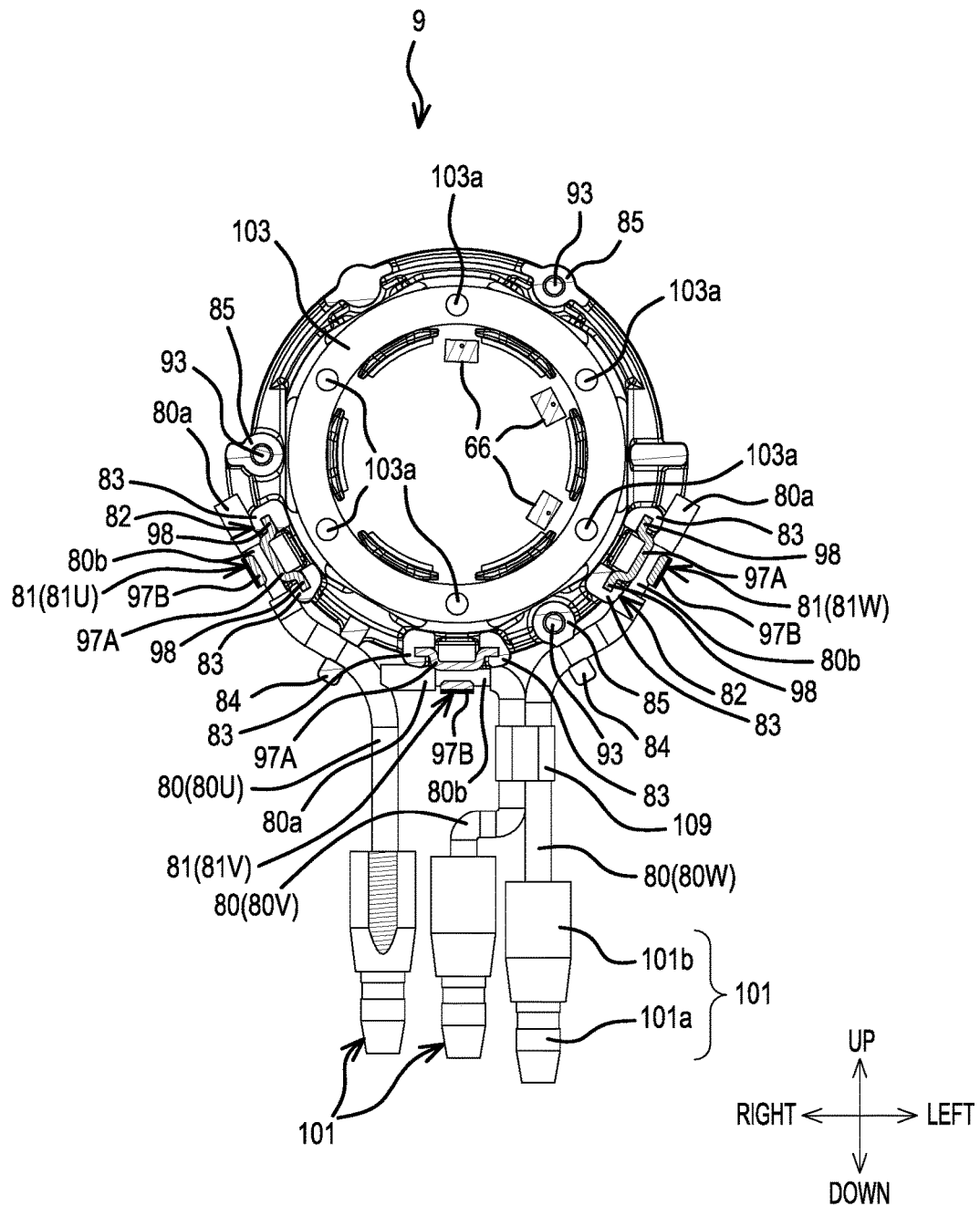
FIG. 12 is a cross-sectional view taken along line C-C in FIG. 7.

Each of the fusing terminals 81 is formed by folding a strip-shaped metal plate into a U shape in a cross section such that one plate part 97A is on the inner side in the radial direction and another plate part 97B is on the outer side in the radial direction. The fusing terminals 81 are held by the retaining part 82 such that a curled part 99 faces rearward. Wing pieces 98, which curve outward in the circumferential direction after having been bent inward in the radial direction, are formed on both sides of the inner side of the plate part 97A, and each wing piece 98 is inserted into its corresponding projection 83. A folded-back part 100a, which is folded back toward the outer side in the radial direction, is formed at a tip part (a front-end part) of the plate part 97B on the outer side. An upper-end part of each power-supply line 80 fits into the inner sides of the curled part 99 of the corresponding fusing terminal 81. In addition, a folded part 100 is formed at the upper side of the curled part 99 of each plate part 97B, and the wire 79 fits on the inner side thereof; in particular, a starting-end part 79a and a finishing-end part 79b of the wire 79 fit into a U-phase fusing terminal 81U (FIG. 11). The fusing terminals 81 are disposed such that they are bundled, by the retaining parts 82, on the radially outer side of a lower-half part (a semicircular portion) of the stator 9.

Each power-supply line 80 comprises a conducting-wire part, which includes a stranded wire, and a covered part, which is an insulating body that covers the conducting-wire part. The upper-end part (tip part) of each power-supply line 80 is bent such that it matches the shape of the corresponding fusing terminal 81 and the periphery thereof (the front insulator 61). At that upper-end part, a covering-remaining part 80a, at which the covered part has been retained, is provided at an uppermost-end part (a tipmost part). A conducting-wire exposed part 80b (a stranded-wire exposed part), which has a prescribed length and at which the conducting-wire part is exposed, is provided on a lower side of the covering-remaining part 80a. The length of the conducting-wire exposed part 80b is slightly greater than the width (size in the circumferential direction) of the fusing terminal 81 (the curled part 99). The portion below (on the base-end side of) the conducting-wire exposed part 80b of the power-supply line 80 is the conducting-wire part that includes the insulation-covered part. Providing the covering-remaining part 80a makes it possible to prevent the stranded wire at the conducting-wire exposed part 80b from fraying, and thereby makes it possible to bundle the conducting wire. In addition to or instead of providing the covering-remaining part 80a, the stranded wire may be prevented from unraveling (fraying) by, for example: (i) covering (all or part of)

the tipmost part of the conducting-wire part with a heat-shrink tube; (ii) crimping the tip of the stranded wire with a splice terminal; (iii) fortifying or impregnating that tipmost part of the stranded wire by soldering, welding, or using a thermosetting resin; or (iv) utilizing a combination thereof.

In addition, bullet terminals 101, which serve as connection terminals, are provided at the tips (lower parts) of the power-supply lines 80 that lead out from the stator 9. Moreover, three power-supply lines, which are not shown, are provided such that they lead out upward from the terminals 19a of the mounting part 18 of the battery pack 5 below, and bullet terminals, which serve as electrical connection terminals, are likewise provided for these power-supply lines. Furthermore, the bullet terminal 101 of each power-supply line 80 and the bullet terminal of the corresponding power-supply line that leads out from the mounting part 18 are configured or adapted to be attached to and detached from one another. When the bullet terminals are attached to one another, each power-supply line 80 is electrically connected to the corresponding power-supply line that leads out from the mounting part 18. The power-supply lines 80, which serve as first power-supply lines, are connected to the coils 64, and the power-supply lines of the controller 20, which serve as second power-supply lines, supply electrical power to the coils 64 via the corresponding power-supply lines 80 and consequently are connected to the battery pack 5 via the terminals 19a of the mounting part 18. In FIGS. 3 and 4, the bullet terminals 101, the power-supply lines therebelow, etc. are omitted for clarity. Furthermore, as discussed above with regard to the connectors 96A, 96B, the number and the connection mode (male/female, misconnection prevention, and the like) of the bullet terminals 101 may be modified. In addition, any of the bullet terminals 101, which are designed to enable the (physical and electrical) attachment and detachment of the power-supply lines 80 and the power-supply lines that lead out from the mounting part 18, or either of the connectors 96A, 96B, which are designed to enable the (physical and electrical) attachment and detachment of the lead wires 95A, 95B, may be omitted. Furthermore, the connectors 96A, 96B may be provided in order to enable the (physical and electrical) attachment and detachment of the power-supply lines 80 and the power-supply lines that lead out from the mounting part 18, and the bullet terminals 101 may be provided in order to enable the (physical and electrical) attachment and detachment of the lead wires 95A, 95B.

Each of the three bullet terminals 101 comprises a conductive-terminal part 101a and an insulation-covered part 101b, and each bullet terminal of the corresponding power-supply line that leads out from the mounting part 18 likewise comprises a conductive-terminal part and an insulation-covered part. The bullet terminals are attached by connecting the conductive-terminal parts together and covering that connection part with the insulation-covered part; the bullet terminals are separated (detached or removed) by moving the insulation-covered part and disconnecting the conductive-terminal parts from one another. Furthermore, one insulation-covered part may be disposed on just one of the power-supply lines, several insulation-covered parts may be disposed on just the conductive-terminal parts on the outermost sides, or a given insulation-covered part may be shared by multiple conductive-terminal parts.

As described above, the sensor circuit board 65 is fixed to the stator 9 by the screws 93. Also, the bullet terminals 101 are interposed between the power-supply lines 80, which supply electric power (current) to the coils 64, and the power-supply lines that lead out from the mounting part 18. In this manner, the power-supply lines 80 and the power-supply lines that lead out from the mounting part 18 are made capable of being attached to and detached from one another. In addition, the connectors 96A, 96B are interposed between the lead wires 95A, which are connected to the magnetic sensors 66 of the sensor circuit board 65, and the lead wires 95B that lead out from the controller 20, and thereby the lead wires 95A, 95B are configured or adapted to be attached to and detached from one another. Thus, by disconnecting the bullet terminals 101 to separate the power-supply lines 80 and the power-supply lines that lead out from the mounting part 18 and by disconnecting the connectors 96A, 96B to separate the lead wires 95A, 95B, the brushless motor 8 can be separated and detached from the mounting part 18 of the battery pack 5, the controller 20, etc. Furthermore, by removing the screws 93, the sensor circuit board 65 can be separated from the stator 9, and the sensor circuit board 65, with the lead wires 95A included, can be removed so that it stands alone. In addition, by attaching the power-supply lines 80 and the power-supply lines that lead out from the mounting part 18, and/or by attaching the connectors 96A, 96B, the removed brushless motor 8, the removed sensor circuit board 65, etc. can once again be connected easily to the mounting part 18, the controller 20, etc. Alternatively, a new brushless motor 8, a new sensor circuit board 65, etc. can easily be connected to the mounting part 18, the controller 20, etc. Furthermore, even if the power-supply lines 80 and the power-supply lines that lead out from the mounting part 18 are not separated, as long as the lead wires 95A, 95B are separated and the screws 93 are removed, the sensor circuit board 65 can be removed. In addition, even if the lead wires 95A, 95B are not separated, as long as the power-supply lines 80 and the power-supply lines that lead out from the mounting part 18 are separated and the screws 93 are removed, the brushless motor 8 (i.e. the portion other than the sensor circuit board 65) can be removed.

A heat-dissipating ring 103, which is made of metal, is provided between the sensor circuit board 65 and the six coils 64. The heat-dissipating ring 103, which serves as a heat-dissipating means, has an inner diameter larger than the diameter of the area in which the magnetic sensors 66 are disposed, and is mounted to the front-end parts of the coils 64 such that it extends across the six coils 64, using a thermally conductive, electrically insulating adhesive. Multiple (six) through holes 103a are provided in the heat-dissipating ring 103, equispaced in the circumferential direction. This design helps to ensure an adequate flow of air passing through the slots 78, increases the area of contact between the heat-dissipating ring 103 and the air, and improves the heat-dissipating ability of the heat-dissipating ring. (Note that the heat-dissipating ring 103 is omitted from FIGS. 5 and 6 for clarity purposes.) In addition, instead of installing one ring-shaped member, such as the heat-dissipating ring 103, the heat-dissipating means may be implemented by installing a single or multiple arcuate members across the multiple coils 64, by providing a member separately on a single or on multiple coils 64, by providing a single or multiple fins on at least one of the members, or by disposing the member on the rear side of the stator 9 instead of or in addition to on the front side of the stator 9.

The six coils 64 are formed by sequentially winding the one wire 79 (i.e., a single, continuous wire) around every tooth 63. The coils 64 are connected to the fusing terminals 81 in accordance with their phase components. Specifically, opposing coils 64 of one phase component are connected by a crossover wire 102, which is disposed on the rear insulator 62 side. A method of winding the coils 64 is explained below. If there is a need to distinguish the three phases of U, V, and W, then the letters U, V, and W are appended to the reference numbers of the constituent parts; and if there is a need to distinguish pairs of the teeth 63, pairs of the coils 64, and the like of the same phase, then the symbols (numerals) 1, 2 are further appended, as in 63U1, 63U2, 64U1, 64U2.

FIG. 14A is a schematic drawing that shows a method of winding the coils 64 on the front insulator 61 side, and FIG. 14B is a schematic drawing of the same, showing the rear insulator 62 side. In these figures, the circled-plus symbols indicate the winding of the wire 79 in a direction perpendicular to the paper surface from the near side to the far side of the paper surface, and the circled-black-dot symbols indicate the winding of the wire 79 in a direction perpendicular to the paper surface from the far side to the near side of the paper surface. Furthermore, the circled-plus symbols indicate a direction rearward of the hammer driver-drill 1 in FIG. 14A and forward of the hammer driver-drill 1 in FIG. 14B.

As used herein, the term "winding direction" is intended to mean the circumferential direction that the wire 79 moves when it first traverses one of the teeth 63. Thus, for example, with reference to FIG. 14A, the wire 79 leading from the fusing terminal 81U travels into the page at the circled-plus side of the tooth 63U1 and moves clockwise before emerging from the page at the circled black-dot side of the tooth 63U1. The wire 79 is therefore said to be wound around the tooth 63U1 in the clockwise direction. Further details related to the winding of the wire 79 are provided below. Furthermore, a wire wound "clockwise" when viewed from the wiring connection side is wound counterclockwise when viewed from the opposite wiring-connection side. When the winding directions of two wires are compared, however, the comparison is made from the same side, e.g., from the wiring-connection side.

In the method of winding the wire 79, first, the starting-end part 79a (refer to FIG. 11) of the wire 79 is temporarily fixed to the fusing terminal 81U whereto a U-phase power-supply line 80U has been temporarily fixed. Then the coil 64U1 is formed by winding the wire 79 from the left side around the tooth 63U1, which is located on the right side of the fusing terminal 81U. Continuing, the wire 79 is led out, on the rear insulator 62 side, from the left side of the tooth 63U1 and then is pulled around, as a crossover wire 102U shown by a solid-lined arrow, toward the upper left along the outer surfaces of the guide ribs 89 of the rear insulator 62 by substantially a semicircle (clockwise in FIG. 14B when viewed forward from the rear of the rear insulator 62), after which the coil 64U2 is formed by winding from the lower side around the tooth 63U2, which opposes the tooth 63U1. Furthermore, the wire 79 is led out, on the front insulator 61 side, from the lower side of the tooth 63U2 and temporarily fixed to a fusing terminal 81W, whereto a W-phase power-supply line 80W has been temporarily fixed.

Continuing, a coil 64W1 is formed by winding the wire 79 from the upper-left side around a tooth 63W1, which is located on the lower side of the fusing terminal 81W. The wire 79 is then led out, on the rear insulator 62 side, from the upper-left side of the tooth 63W1; a crossover wire 102W, which is shown by a dotted-line arrow, is pulled around rightward on the outer sides of the guide ribs 89 by substantially a semicircle, and then a coil 64W2 is formed by winding from the upper side around a tooth 63W2, which opposes the tooth 63W1. Furthermore, the wire 79 is led out, on the rear insulator 62 side, from the lower side of the tooth 63W2 and then is pulled around, as another crossover wire 102W shown by the dotted-line arrow, leftward on the outer sides of the guide ribs 89 by substantially a semicircle. After this the wire 79 is led out, on the front insulator 61 side, on the right side of the tooth 63W1 and temporarily fixed to a fusing terminal 81V, whereto a V-phase power-supply line 80V has been temporarily fixed. That is, the wire 79 between the W-phase coils 64W1, 64W2 becomes the crossover wires 102W, which cross over a total of two times, substantially a semicircular portion each time, on the rear insulator 62 side.

Figure 15:
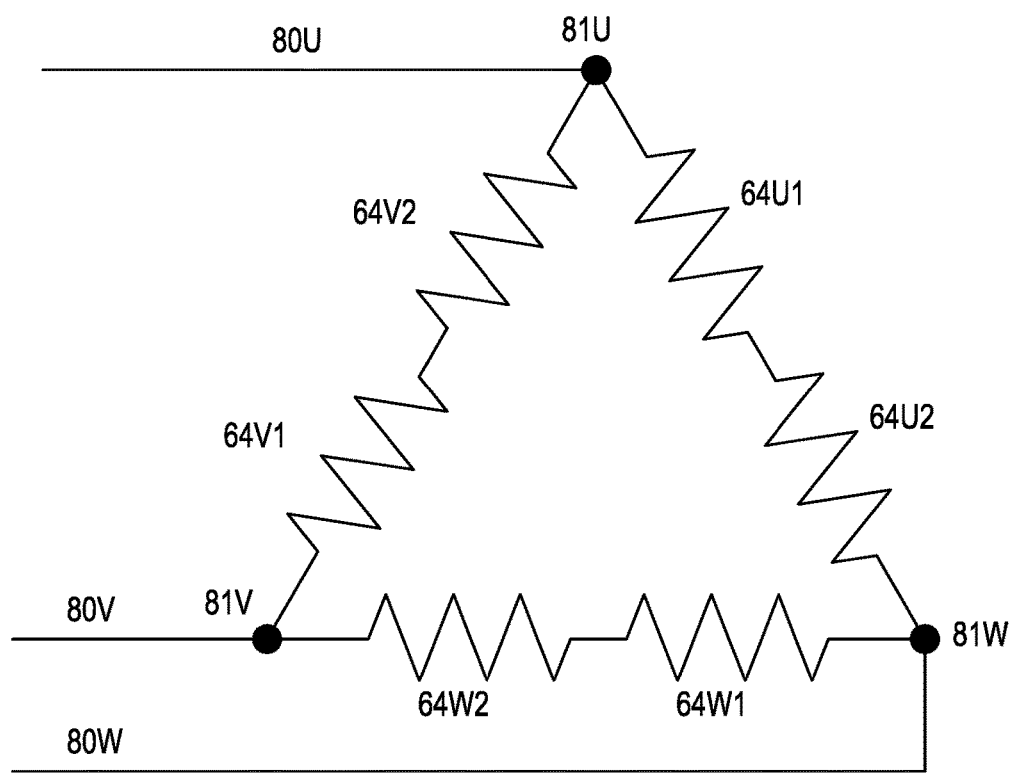
FIG. 15 is a circuit diagram that schematically shows a wiring arrangement of the coils shown in FIG. 5.

Furthermore, a coil 64V1 is formed by winding the wire 79 from the left side around a tooth 63V1, which is located on the right side of the fusing terminal 81V. The wire 79 is then led out, on the rear insulator 62 side, from the left side of the tooth 63V1. A crossover wire 102V, which is shown by a chain-line arrow, is pulled around upward on the outer sides of the guide ribs 89 by substantially a semicircle, after which a coil 64V2 is formed by winding from the left side around a tooth 63V2, which opposes the tooth 63V1. The wire 79 is then led out, on the rear insulator 62 side, from the right side of the tooth 63V2 and then is pulled around, as another crossover wire 102V shown by a chain-line arrow, downward on the outer sides of the guide ribs 89 by substantially a semicircle. After this, the wire 79 is led out, on the front insulator 61 side, on the right side of the tooth 63V1 and the finishing-end part 79b of the wire 79 is temporarily connected to the fusing terminal 81U. That is, the wire 79 between the V-phase coils 64V1, 64V2 becomes the crossover wires 102V which cross over a total of two times, substantially a semicircular portion each time, on the rear insulator 62 side. The crossover wires 102U, 102W, 102V are disposed, such that they overlap in the axial direction, on the outer sides of the guide ribs 89 in the radial direction. Furthermore, by fusing the power-supply lines 80 and the wire 79 at each of the fusing terminals, as shown in FIG. 15, the pair of the coils 64 for each phase is connected in series in the stator 9, and all the phases are delta connected.

After the wiring connection has been completed in this manner, the power-supply lines 80 are connected to the coils 64 without traversing (transiting) the front side of the sensor circuit board 65. In this manner, the power-supply lines do not interfere with the removal of the sensor circuit board 65 from the stator 9. In addition, the sensor circuit board 65 is supported by upper surfaces of the screw bosses 85 and the receiving surfaces 87 of the stepped bosses 86A, 86B such that the sensor circuit board 65 is orthogonal to the axis line of the stator 9 and located at a position forward of the ring-shaped, front-end surface of the front insulator 61. At this time, the tips (front ends) of the hooks 84 contact lower surfaces of the long fixing pieces 92A, 92B, thereby supporting the fixing pieces 92A, 92B. The crossover wires 102 between the coils 64 of each phase are disposed on the rear insulator 62 side, and therefore a gap is formed (provided) between the front insulator 61 and the sensor circuit board 65. In addition, the retaining parts 82 and the fusing terminals 81 pass through the notched parts (notches) 91 of the sensor circuit board 65 and protrude forward of the sensor circuit board 65. Furthermore, the slots 78 are disposed at locations at which, when looking rearward from the front side, they overlap the notched parts (notches) 91 in the circumferential direction.

Furthermore, the power-supply lines 80 are held by the hooks 84 and the fixing pieces 92. This design prevents movement of the power-supply lines 80 after wiring and makes it possible to wire the power-supply lines 80 easily by hooking them on the hooks 84. In addition, because the fixing piece 92A, to which the lead wires 95A of the magnetic sensors 66 are connected, is supported by the hooks 84, the lead wires 95A tend not to disconnect. Furthermore, because the distance in a radial direction from an axial center of the brushless motor 8 to the center of the boss 88A is smaller than the distance in the radial direction from that axial center to the centers of the screws 93, vibration of the sensor circuit board 65 during operation is reduced.

In the hammer driver-drill 1 of this type, when the switch 14 is turned ON by squeezing the trigger 15, the microcontroller of the controller 20 (i) acquires the rotational state of the rotor 10 by receiving rotation-detection signals, which are output from the magnetic sensors 66 of the sensor circuit board 65, and which indicate the positions of the permanent magnets 68 of the rotor 10, (ii) controls the ON/OFF state of the switching devices in accordance with the acquired rotational state, and (iii) rotates the rotor 10 by sequentially supplying excitation current to the coils 64 of each phase of the stator 9. Consequently, the rotary shaft 11 rotates, the spindle 13, the drill chuck 4, etc. rotate via the planetary-gear, speed-reducing mechanism 33 in accordance with the selected operation mode, and the bit mounted to the drill chuck 4 rotates and can be applied against a workpiece.

When the centrifugal fan 70 rotates together with the rotation of the rotary shaft 11, outside air is sucked in via the air-suction ports 72 on the side surfaces of the housing 6, passes over the outer side of the stator 9 and the inner side of the stator 9 (between the stator 9 and the rotor 10), and is discharged via the air-exhaust ports 71, thereby cooling the brushless motor 8. As was described above, in the stator 9, the slots 78 are exposed, when looking rearward from the front side, by the notched parts (notches) 91 of the sensor circuit board 65. Furthermore, because the crossover wires 102 are not wired between the sensor circuit board 65 and the front insulator 61, the air that passes by the inner side of the stator 9 can pass smoothly through the slots 78 on both sides of the coils 64 without being hindered by the sensor circuit board 65, the crossover wires 102, or the like. Consequently, each of the coils 64 is effectively cooled. In addition, because the fusing terminals 81 are disposed between the fixing pieces 92, the fusing terminals 81 are effectively cooled by the air that passes through the notched parts (notches) 91. Furthermore, in the rotor 10, the front stopper 74 and the rear stopper 73 are provided at the front and rear, respectively, and consequently movement of the permanent magnets 68 in the front-rear direction is restricted or prevented and the permanent magnets 68 are effectively prevented from coming off of the rotor core 67.

Furthermore, the above hammer driver-drill 1 includes the stator 9, which comprises the coils 64, the sensor circuit board 65, which is attached to the stator 9 and to which the magnetic sensors 66, are provided, the rotor 10, which is capable of rotating with respect to the stator 9, the drill chuck 4, which is driven by the rotor 10, and the power-supply lines 80, which are for supplying electrical power to the coils 64. Furthermore, the power-supply lines 80 are connected to the coils 64 without traversing (transiting) the front side of the sensor circuit board 65. Consequently, the sensor circuit board 65 can be removed with the connection to the power-supply lines 80 maintained as is. In addition, the effects of the magnetic sensors 66 on the sensor circuit board 65, the effects of the lead wires 95A, and the effects of (the electric currents within) the power-supply lines 80 on the connection part 94 can be reduced, and thus the reliability of the magnetic sensors 66 and the signals produced thereby is greatly increased.

An embodiment of the disclosure includes the stator 9, which comprises the coils 64, the sensor circuit board 65, which is attached to the stator 9 by the screws 93 and on which the magnetic sensors 66 are provided, the rotor 10, which is configured or adapted to rotate with respect to the stator 9, and the drill chuck 4, which is configured or adapted to be driven by the rotor 10. Furthermore, the sensor circuit board 65 may be removed from the stator 9 by removing the screws 93. Consequently, because the sensor circuit board 65 can be separated from the stator 9 in a manner that allows it to be easily reconnected, the maintenance, repair, etc. of the sensor circuit board 65, the stator 9, etc. become easy and inexpensive.

An embodiment of the disclosure comprises the stator 9, which comprises the coils 64, the sensor circuit board 65, which is attached to the stator 9 and on which the magnetic sensors 66 are provided, the rotor 10, which is configured or adapted to rotate with respect to the stator 9, the drill chuck 4, which is configured or adapted to be driven by the rotor 10, the controller 20, which is configured or adapted to control the rotation of the rotor 10, the lead wires 95A, which are connected to the magnetic sensors 66, and the lead wires 95B, which are connected to the controller 20. Furthermore, the lead wires 95A and the lead wires 95B are configured or adapted to attached to and detached from one another. Consequently, the sensor circuit board 65 can be separated from the controller 20 by detaching and removing the lead wires 95A, 95B. Reconnection of these elements is easy, and thus maintenance, repair, etc. of the sensor circuit board 65, the controller 20, etc. become easy and inexpensive. In addition, the connectors 96A, 96B are interposed between the lead wires 95A, 95B, and are configured or adapted to be attached and detached in a simple manner.

An embodiment of the disclosure includes the stator 9, which comprises the coils 64, the rotor 10, which is configured or adapted to rotate with respect to the stator 9, the drill chuck 4, which is driven by the rotor 10, the power-supply lines, which lead out from the mounting part 18 of the battery pack 5 (the battery pack 5 being configured or adapted to supply electric power (current) to the coils 64), and the power-supply lines 80, which are connected to the coils 64. Furthermore, the power-supply lines that lead out from the mounting part 18 and the power-supply lines 80 are configured to be attached to and detached from one another. Consequently, the stator 9 can be separated from the mounting part 18 by detaching and removing the power-supply lines that lead out from the mounting part 18 and the power-supply lines 80. Reconnection of these elements is easy, and thus maintenance, repair, etc. of the stator 9, the mounting part 18, etc. become easy and inexpensive. In addition, the bullet terminals 101 are interposed between the power-supply lines that lead out from the mounting part 18 and the power-supply lines 80 and thus can be attached and detached in a simple manner.

An embodiment of the disclosure includes the stator 9, which comprises the coils 64, the rotor 10, which is configured or adapted to rotate with respect to the stator 9, the drill chuck 4, which is configured or adapted to be driven by the rotor 10, the fusing terminals 81, which are fixed to the stator 9 and connected to the coils 64, and the power-supply lines 80, which comprise the stranded wires (the conducting-wire exposed parts 80b) and are designed to supply electric power (current) to the coils 64. Furthermore, the power-supply lines 80 are connected to the fusing terminals 81 with the stranded-wire-fray preventing means in place. The stranded-wire-fray preventing means are designed to prevent fraying (unraveling) of the stranded wires (the conducting-wire exposed parts 80*b*). Consequently, it is possible to prevent situations in which the wiring of the power-supply lines 80 becomes difficult due to fraying of the stranded wires and situations in which the power-supply lines 80 become connected to something other than the desired fusing terminals 81, or the like. In addition, each of the power-supply lines 80 comprises the covered part that covers the stranded wire. Furthermore, each instance of the abovementioned stranded-wire-fray preventing means comprises the covering-remaining part 80*a*. In this manner, with the conducting-wire exposed part 80*b* connected to the corresponding fusing terminal 81 and the covering-remaining part 80*a* in place, the stranded-wire-fray preventing means is configured simply.

Furthermore, the embodiments of the present disclosure are not limited to the abovementioned embodiments. For example, the following types of modifications can be implemented with respect to the abovementioned embodiments where appropriate. Instead of the latching recessed part of the front insulator or in combination therewith, the positioning in the front-rear direction, the rotational locking, or the like of the stator may be performed by providing a projection part on an outer surface of the stator core and engaging that projection part with a hollow (recess) formed on the inner surface of the housing. In addition, in the brushless motor: the coils may be formed with a plurality of wires; the coils of each phase may be Y connected; the number of poles, the number of slots, and the like may be increased; instead of an interior permanent magnet type (IPM-type) rotor wherein the permanent magnets are embedded, the rotor may be a surface permanent magnet type (SPM type) wherein the permanent magnets are disposed on the surface; and instead of being flat-plate shaped, the magnets of the rotor may be curved along the rotational direction; and the like. The power-supply lines may be connected to the stator (the coils) via the sensor circuit board. The screws for attaching the sensor circuit board may include press-fitting pins, tabbed pins (claw pins), or the like. The arrangement of the magnetic sensors on the sensor circuit board can be variously modified, such as by spanning the entire circumference. The lead wires of the magnetic sensors may extend in the axial direction of the stator and may be disposed along the extension lines of the slots. The switching devices that form the inverter circuit may be provided on the sensor circuit board. In such a case, the switching devices may be disposed at locations that overlap the magnetic sensors in the axial direction, or may be disposed at locations that do not overlap in the axial direction.

The fan may be disposed forward of the stator. The battery can be an arbitrary lithium ion battery of 14.4 V or 18 V (max. 20 V), or, e.g., in the range of 18-36 V, such as 18 V, 25.2 V, 28 V, or 36 V. Furthermore, one or more lithium ion batteries having a voltage that is less than 10.8 V or greater than 36 V can be used; in addition, other types of battery chemistries can also be used. The number, type, material, arrangement, size, or the like of the various members can be modified where appropriate. For example, the number of sections of the housing, the number of the planetary gears installed, the number of stages of the speed-reducing mechanism, the number of balls and rollers, the number of the various projecting bodies, protruding pieces, and screws, and the number of the magnetic sensors may be increased; the type of the switch of the switch lever may be modified. The permanent magnets may be configured as coils (electromagnets). The balls, which are made of steel, may be made of brass; and the like.

In addition, the present disclosure can also be adapted to an "angled" power tool, wherein the direction of the output shaft (the tool-accessory retaining part) differs (e.g., by substantially 90°) from the direction of the motive-power part (the direction of the rotor shaft of the motor, the transmission direction of the mechanism that transmits that rotational force, and the like). Furthermore, the present disclosure can also be adapted to other power tools that are not rechargeable (i.e., not battery driven, such as those driven by a commercial AC power supply of 100-240V), such as a driver-drill, an impact driver, a grinder, a circular saw, a hammer, or a hammer drill; gardening tools, such as a cleaner, a blower, or a trimmer; and the like.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings to provide improved power tools.

Moreover, combinations of features and steps disclosed in the above detailed description, as well as in the below additional examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Finally, additional embodiments according to the present teachings include, but are not limited to:

1. A power tool, comprising a stator comprising a coil; a rotor configured to rotate with respect to the stator; a tool-accessory retaining part configured to be driven by the rotor; a first power-supply line connected to a source of electric current; and a second power-supply line connected to the coil, wherein the first power-supply line is releasably connected to the second power-supply line.

2. A power tool according to embodiment 1, wherein the first power-supply line is provided with a first connection terminal, the second power-supply line is provided with a second connection terminal and the first connection terminal is releasably connected to the second connection terminal.

3. A power tool according to embodiment 1 or 2, wherein second the power supply line is connected to the coil such that a sensor circuit board connected to the stator is removable from the stator without moving the power supply line.

4. A power tool, comprising a stator comprising a coil; a rotor configured to rotate with respect to the stator; a tool-accessory retaining part configured to be driven by the rotor; a fusing terminal fixed to the stator and connected to the coil; and a power-supply line that comprises stranded wires and is configured to supply electric current to the coil, wherein the power-supply line is connected to the fusing terminal and includes a stranded-wire-fray preventing means for preventing fraying of the stranded wires.

5. A power tool according to embodiment 4, wherein the power-supply line comprises a covered part that covers the stranded wires; and wherein the stranded-wire-fray preventing means comprises a covering-remaining part, and the power-supply line includes an exposed part at which the stranded wires are exposed, wherein the exposed part is located between the covered part and the covering-remaining part.

EXPLANATION OF THE REFERENCE NUMBERS

1 Driver-drill (power tool)
4 Drill chuck (tool-accessory retaining part)
9 Stator
10 Rotor
18 Mounting part (of battery pack 5)
20 Controller (control circuit board)
64 Coil
65 Sensor circuit board
66 Magnetic sensor
80 Power-supply line (second power-supply line)
80a Covering-remaining part (stranded-wire-fray preventing means)
80b Conducting-wire exposed part (stranded-wire exposed part)
81 Fusing terminal
93 Screw
95A Lead wire (first sensor-signal line)
95B Lead wire (second sensor-signal line)
101 Bullet terminal (connection terminal)

The invention claimed is:

1. A power tool, comprising:
a stator comprising a coil;
a sensor circuit board attached to the stator and on which a magnetic sensor is provided, the sensor circuit board having a first side facing the stator and a second side opposite the first side;
a rotor configured to rotate with respect to the stator;
a tool-accessory retaining part configured to be driven by the rotor;
a power-supply line configured to supply electric current to the coil;
a first sensor-signal line connected to the magnetic sensor; and
a second sensor-signal line connected to a control circuit board;
wherein the power-supply line is connected to the coil without traversing the second side of the sensor circuit board, and
the first sensor-signal line and the second sensor-signal line are releasably connected to one another.

2. The power tool according to claim 1, wherein the sensor circuit board does not extend between the power-supply line and the stator.

3. The power tool according to claim 1, wherein the power supply line is connected to the coil such that the sensor circuit board is removable from the stator without moving the power supply line.

4. A power tool, comprising:
a stator comprising a coil;
a sensor circuit board attached to the stator and on which a magnetic sensor is provided, the sensor circuit board having a first side facing the stator and a second side opposite the first side;
a rotor configured to rotate with respect to the stator;
a tool-accessory retaining part configured to be driven by the rotor;
a first power-supply line connected to a source of electrical power; and
a second power-supply line connected to the coil;
wherein the first power-supply line is releasably connected to the second power supply line, and
the first and second power-supply lines do not traverse the second side of the sensor circuit board.

5. The power tool according to claim 4, including:
a first sensor-signal line connected to the magnetic sensor; and
a second sensor-signal line connected to a control circuit board;
wherein the first sensor-signal line and the second sensor-signal line are releasably connected to one another.

6. The power tool according to claim 4, wherein the second power-supply line comprises stranded wires and includes a covered part that covers the stranded wires, a stranded-wire fray preventing means and an exposed part between the covered part and the stranded-wire fray preventing means.

7. The power tool according to claim 6, wherein:
the sensor circuit board does not extend between the power-supply line and the stator,
the second power supply line is connected to the coil such that the sensor circuit board is removable from the stator without moving the second power supply line,
the sensor circuit board is releasably connected to the stator by at least one screw,
a first sensor-signal line is connected to the magnetic sensor,
a second-signal line is connected to a control circuit board, and
the first sensor-signal line and the second sensor-signal line are releasably connected to one another.

8. The power tool according to claim 1, wherein the sensor circuit board is releasably connected to the stator by at least one screw.

9. The power tool according to claim 8, wherein:
the at least one screw extends through an opening in the sensor circuit board and into an opening in the stator; and
the sensor circuit board is releasable from the stator by removing the at least one screw from the opening in the sensor circuit board.

10. The power tool according to claim 8, wherein the sensor circuit board is releasably connected to the stator only by the at least one screw.

11. The power tool according to claim 8, wherein the power-supply line comprises:
a first power-supply line connected to a source of electric current; and
a second power-supply line connected to the coil, the first power-supply line being releasably connected to the second power supply line.

12. The power tool according to claim 1, wherein:
the control circuit board is configured to control the rotation of the rotor.

13. The power tool according to claim 12,
wherein the power-supply line is connected to the coil such that the sensor circuit board is removable from the stator without moving the power-supply line.

14. The power tool according to claim 12, wherein the power-supply line comprises:
a first power-supply line connected to a source of electric current; and
a second power-supply line connected to the coil;
wherein the first power-supply line is provided with a first connection terminal, the second power-supply line is provided with a second connection terminal and the first connection terminal is releasably connected to the second connection terminal.

15. The power tool according to claim 14, wherein the second power-supply line is connected to the coil such that a sensor circuit board connected to the stator is removable from the stator without moving the first power supply line.

16. The power tool according to claim 12, including:
a fusing terminal fixed to the stator and connected to the coil; and
a power-supply line that comprises stranded wires and is configured to supply electric current to the coil;
wherein the power-supply line is connected to the fusing terminal and includes a stranded-wire-fray preventing means for preventing fraying of the stranded wires,
the power-supply line comprises a covered part that covers the stranded wires,
the stranded-wire-fray preventing means comprises a covering-remaining part, and
the power-supply line includes an exposed part at which the stranded wires are exposed, the exposed part being located between the covered part and the covering-remaining part.

17. The power tool according to claim 1, wherein:
the stator comprises the coil, a stator core and an insulator, and
the power-supply line is arranged between the sensor circuit board and the stator core.

18. A power tool, comprising:
a stator comprising a coil;
a sensor circuit board attached to the stator and on which a magnetic sensor is provided, the sensor circuit board having a first side facing the stator and a second side opposite the first side;
a rotor configured to rotate with respect to the stator;
a tool-accessory retaining part configured to be driven by the rotor; and
a power-supply line configured to supply electric current to the coil;
wherein:
the power-supply line is connected to the coil without traversing the second side of the sensor circuit board;
the sensor circuit board is releasably connected to the stator by at least one screw that extends through an opening in the sensor circuit board and into an opening in the stator; and
the sensor circuit board is releasably from the stator by removing the at least one screw from the opening in the sensor circuit board.

19. The power tool according to claim 18, wherein the sensor circuit board is releasably connected to the stator only by the at least one screw.

20. the power tool according to claim 19, including:
a first sensor-signal line connected to the magnetic sensor;
a second sensor-signal line connected to a control circuit board, the first sensor-signal line and the second sensor-signal line being releasably connected to one another;
wherein the power-supply line comprises:
a first power-supply line connected to a source of electric current; and
a second power-supply line connected to the coil, the first power-supply line being releasably connected to the second power supply line.

* * * * *